(12) United States Patent
Kumazaki et al.

(10) Patent No.: US 8,370,034 B2
(45) Date of Patent: Feb. 5, 2013

(54) CONTROL DEVICE AND CONTROL METHOD FOR VEHICLE POWER TRANSMISSION DEVICE

(75) Inventors: Kenta Kumazaki, Toyota (JP); Tooru Matsubara, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1162 days.

(21) Appl. No.: 12/230,232

(22) Filed: Aug. 26, 2008

(65) Prior Publication Data

US 2009/0076693 A1 Mar. 19, 2009

(30) Foreign Application Priority Data

Sep. 13, 2007 (JP) ................................. 2007-238476

(51) Int. Cl.
 *G06F 7/00* (2006.01)
(52) U.S. Cl. ........................................................ 701/55
(58) Field of Classification Search .................. None
 See application file for complete search history.

(56) References Cited

U.S. PATENT DOCUMENTS

| | | | | |
|---|---|---|---|---|
| 7,654,934 B2* | 2/2010 | Alfredson | | 477/35 |
| 7,749,131 B2* | 7/2010 | Imamura et al. | | 477/3 |
| 7,824,307 B2* | 11/2010 | Matsubara et al. | | 477/5 |
| 7,896,123 B2* | 3/2011 | Ohashi et al. | | 180/305 |
| 2001/0046911 A1* | 11/2001 | Taniguchi et al. | | 474/18 |
| 2003/0109349 A1* | 6/2003 | Teraoka et al. | | 475/214 |
| 2003/0163235 A1* | 8/2003 | Tokura et al. | | 701/67 |
| 2005/0059520 A1* | 3/2005 | Wodeslavsky | | 475/59 |
| 2006/0213706 A1* | 9/2006 | Gouda et al. | | 180/65.4 |
| 2006/0272878 A1* | 12/2006 | Ohashi et al. | | 180/305 |
| 2007/0179004 A1* | 8/2007 | Endo | | 475/116 |
| 2007/0187169 A1* | 8/2007 | Sasaki et al. | | 180/444 |
| 2007/0275808 A1* | 11/2007 | Iwanaka et al. | | 475/5 |
| 2008/0149407 A1* | 6/2008 | Shibata et al. | | 180/65.2 |
| 2008/0195286 A1* | 8/2008 | Tabata et al. | | 701/51 |
| 2008/0227591 A1* | 9/2008 | Imamura et al. | | 477/3 |
| 2008/0254934 A1* | 10/2008 | Kumazaki et al. | | 477/3 |
| 2008/0318727 A1* | 12/2008 | Matsubara et al. | | 477/3 |

(Continued)

FOREIGN PATENT DOCUMENTS

| | | |
|---|---|---|
| JP | A-2005-264762 | 9/2005 |
| JP | A-2006-46541 | 2/2006 |

OTHER PUBLICATIONS

Japanese Patent Office, Notification of Reason(s) for Refusal mailed Nov. 28, 2011 in Japanese Patent Application No. 2007-238476 w/Partial English-language Translation.

*Primary Examiner* — Thomas Tarcza
*Assistant Examiner* — Adam Alharbi
(74) *Attorney, Agent, or Firm* — Oliff & Berridge, PLC

(57) ABSTRACT

When an engine stop control is executed while an automatic ratio shift portion is in a neutral state, a switching clutch is operated, so that a differential portion carrier of a differential portion planetary gear device that is linked to an engine, and a differential portion ring gear linked the automatic ratio shift portion are integrally rotated. Therefore, along with the engine stop control, the rotation speed of the rotating elements of the differential portion planetary gear device is reduced while the rotating elements are integrally rotated or substantially integrally rotated. Since the rotating elements are rotated integrally or substantially integrally, the high rotation speed of the differential portion ring gear linked to the automatic ratio shift portion, which tends to have a heightened rotation speed particularly during the neutral state, is prevented.

17 Claims, 9 Drawing Sheets

U.S. PATENT DOCUMENTS

2009/0062055 A1* 3/2009 Alfredson .................... 475/233
2009/0075779 A1* 3/2009 Kumazaki et al. ............... 477/3
2009/0170649 A1* 7/2009 Murakami et al. .............. 475/5
2010/0151988 A1* 6/2010 Tabata et al. ................... 477/3

* cited by examiner

FIG. 2

| | C0 | C1 | C2 | B0 | B1 | B2 | B3 | SPEED CHANGE RATIO | RATIO STEP |
|---|---|---|---|---|---|---|---|---|---|
| 1st | ◎ | ○ | | | | | ○ | 3.357 | |
| 2nd | ◎ | ○ | | | | ○ | | 2.180 | 1.54 |
| 3rd | ◎ | ○ | | | ○ | | | 1.424 | 1.53 |
| 4th | ◎ | ○ | ○ | | | | | 1.000 | 1.42 |
| 5th | | ○ | ○ | ◎ | | | | 0.705 | 1.42 |
| R | | | ○ | | | | ○ | 3.209 | TOTAL 4.76 |
| N | | | | | | | | | |

○ ENGAGED

◎ ENGAGED DURING STEPPED MODE, RELEASED DURING STEPLESS MODE

CONTROL DEVICE AND CONTROL
METHOD FOR VEHICLE POWER
TRANSMISSION DEVICE

INCORPORATION BY REFERENCE

The disclosure of Japanese Patent Application No. 2007-238476 filed on Sep. 13, 2007 including the specification, drawings and abstract is incorporated herein by reference in its entirety.

BACKGROUND OF THE INVENTION

1. Field of the Invention

The invention relates to a control device and a control method for a vehicle power transmission device. In particular, the invention relates to an engine stop control during a neutral state in a vehicle power transmission device that includes an electrical differential portion in which the differential state of a differential mechanism is electrically controlled and an engagement device that constitutes a portion of a power transmission path.

2. Description of the Related Art

There is a known vehicle power transmission device that includes an electrical differential portion in which the differential state between the rotation speed of an input shaft and the rotation speed of an output shaft is controlled through the control of the state of operation of a first electric motor linked to a rotating element of a differential mechanism, and an engagement device that constitutes a portion of a power transmission path between the electrical differential portion and driving wheels. An example of this device is a vehicle power transmission device described in Japanese Patent Application Publication No. 2006-46541 (JP-A-2006-46541). In this hybrid type vehicle power transmission device, the differential mechanism is constructed of, for example, a planetary gear device, and the first electric motor is linked to a rotating element of the differential mechanism so as to be capable of power transmission. In the vehicle power transmission device of JP-A-2006-46541, when the engine is to be stopped, a lock mechanism (a switching clutch C0 and a switching brake B0) that is provided in the electrical differential portion and that restricts the differential state is put into a released state, and the engine rotation speed is promptly reduced by using the first electric motor, so that the engine rotation speed promptly passes through an engine rotation speed region in which resonance of a power transmission system occurs.

In the vehicle power transmission device of JP-A-2006-46541, however, if the engine stop control is executed while the ratio shift portion is in the neutral state (power transmission disconnected state), the inertia of a rotating element of the differential mechanism linked to the ratio shift portion (which corresponds to a ring gear in JP-A-2006-46541) is lessened since the rotating element is not linked to the driving wheels. If during this state, torque (negative torque) in a negative direction (reverse rotation direction) acts on the first electric motor, the momentum of the negative torque causes the rotation speed of the rotating element (ring gear) linked to the ratio shift portion to become high due to the differential motion effect. Thus, there is possibility of decline of the durability of various components and the like, including the seal component parts and the bearings that support the differential mechanism.

SUMMARY OF THE INVENTION

The invention provides a control device and a control method for a vehicle power transmission device that includes an electrical differential portion and an engagement device and that prevents excessively high rotation speed of a rotating element of the differential mechanism at the time of an engine stop control.

An aspect of the invention is a control device for a vehicle power transmission device including (a) an electrical differential portion that includes a differential mechanism and a first electric motor and in which a differential state between rotation speed of an input shaft and rotation speed of an output shaft is controlled through control of operation of the first electric motor that is linked to a rotating element of the differential mechanism so as to be capable of power transmission, and an engagement device that constitutes a portion of a power transmission path between the electrical differential portion and a driving wheel, the control device being characterized by including: (b) a lock mechanism that restricts the differential state of the differential mechanism; and (c) an engine stop control device that operates the lock mechanism when an engine stop control is executed while the engagement device is in a non-engaged state.

Besides, the control device for the vehicle power transmission device may further include a ratio shift portion provided on the power transmission path, wherein the engagement device is a portion of the ratio shift portion.

Besides, in the control device for the vehicle power transmission device, the engine stop control device may control applying a drive torque in such a direction as to reduce engine rotation speed, to the first electric motor linked to the rotating element of the differential mechanism so as to be capable of power transmission.

Besides, in the control device for the vehicle power transmission device, the lock mechanism may operate if a rotation speed difference between the engine and the rotating element of the differential mechanism is within a predetermined range.

Besides, in the control device for the vehicle power transmission device, the lock mechanism may operate if rotation speed of the rotating element of the differential mechanism is greater than or equal to a predetermined value.

Besides, in the control device for the vehicle power transmission device, the differential state may be restricted by causing rotation of the rotating element linked to the first electric motor to be in a fixed or slipping state.

Besides, in the control device for the vehicle power transmission device, the differential state may be restricted by causing at least two rotating elements to be in a locked-up or slipping state.

Besides, in the control device for the vehicle power transmission device, the ratio shift portion may perform an automatic ratio shift.

Besides, in the control device for the vehicle power transmission device, the ratio shift portion may be a stepped-ratio transmission.

Besides, in the control device for the vehicle power transmission device, the electrical differential portion may be constructed of at least two electric motors, and a planetary gear device.

Besides, in the control device for the vehicle power transmission device, the electrical differential portion may operate as a continuously variable transmission mechanism due to control of operation of the first electric motor.

According to the control device for a vehicle power transmission device of the foregoing aspect of the invention, when the engine stop control is executed, with the engagement device being in the neutral state, the lock mechanism is operated. Therefore, the rotating element of the differential mechanism that is linked to the engine, and the rotating element thereof linked to the engagement device are rotated integrally or rotated substantially integrally while the slipping state is maintained. Therefore, along with the engine stop control, the rotation speed of the rotating elements of the differential mechanism is reduced, with the rotating elements being rotated integrally or substantially integrally. Due to the integral or substantially integral rotation of the rotating elements, the high rotation speed of the rotating element linked to the engagement device that tends to have a high rotation speed particularly during the neutral state can be prevented. Since the high rotation speed is prevented in this manner, the decline of the durability of various-components and the like, including the seal component parts and the bearings that support the differential mechanism, can be restrained.

Besides, according to the control device for the vehicle power transmission device of the invention, the ratio shift portion is provided on the power transmission path, and the engagement device is a portion of the ratio shift portion. Therefore, when the engagement device enters the non-engaged state, the ratio shift portion enters the neutral state, so that the power transmission to the driving wheel can be disconnected.

Besides, according to the control device for the vehicle power transmission device of the invention, at the time of the engine stop control in the non-engaged state of the engagement device, the lock mechanism is operated, and a drive torque in such a direction as to reduce the engine rotation speed is applied to the first electric motor linked to the rotating element of the differential mechanism so as to be capable of power transmission. Therefore, the engine rotation speed can be promptly reduced. Herein, if while the lock mechanism is not operated the first electric motor is driven in such a direction as to reduce the engine rotation speed, the momentum of the drive torque of the first electric motor causes the rotation speed of the rotating element linked to the engagement device to rise due to the differential motion of the differential mechanism, since the rotating element linked to the engagement device being presently in the non-engaged state has a smaller inertia than the rotating element linked to the engine. In other words, a portion of the drive torque of the first electric motor for reducing the engine rotation speed is used to raise the rotation speed of the rotating element linked to the engagement device. However, if the lock mechanism is operated, the rotating elements of the differential mechanism are rotated integrally or rotated substantially integrally, so that the entire drive torque of the first electric motor can be used to reduce the engine rotation speed. As a result, the engine rotation speed is promptly reduced by the first electric motor, and the high rotation speed of the rotating element linked to the engagement device can be prevented.

Besides, according to the control device for the vehicle power transmission device of the invention, the lock mechanism is operated if the rotation speed difference between the engine and the predetermined rotating element of the differential mechanism is within the predetermined range. Therefore, the operation of the lock mechanism with the rotation speed difference being large can be avoided. If the lock mechanism is operated with the rotation speed difference being large, the load that acts on the lock mechanism becomes large, and therefore there is a possibility of decline of the durability of the lock mechanism. Therefore, by avoiding the operation of the lock mechanism during the state in which the rotation speed difference is large, the decline of the durability of the lock mechanism can be restrained.

Besides, according to the control device for the vehicle power transmission device of the invention, since the lock mechanism operates if the rotation speed of the predetermined rotating element of the differential mechanism is higher than or equal to the predetermined value, the lock mechanism is not operated if the rotation speed of the predetermined rotating element is relatively low. If the rotation speed of the rotating element is relatively low, the operation of the lock mechanism is not needed in order to keep the rotation speed of the rotating element within an allowable rotation speed range even if the rotation speed thereof rises. Therefore, since this control is not executed if the rotation speed of the predetermined rotation element is less than the predetermined value, the burden of the control can be reduced.

Besides, according to the control device for the vehicle power transmission device of the invention, the differential state is restricted by causing the rotation of the rotating element linked to the first electric motor to be in a fixed or slipping state. Therefore, it is possible to restrain the high rotation speed of the predetermined rotating element due to the differential motion of the differential mechanism on the basis of the rotation speed of the rotating element linked to the first electric motor and the rotating element linked to the engine.

Besides, according to the control device for the vehicle power transmission device of the invention, since the differential state is restricted by causing at least two rotating elements to be in a locked-up or slipping state, the rotating elements of the differential mechanism are integrally rotated as one unit, so that the high rotation speed of the rotating element can be restrained.

Besides, according to the control device for the vehicle power transmission device of the invention, since the ratio shift portion performs automatic ratio shift, the automatic ratio shift is suitably performed in accordance with the state of travel of the vehicle, so that suitable drive force can be obtained.

Besides, according to the control device for the vehicle power transmission device of the invention, since the ratio shift portion is a stepped-ratio transmission, the speed change ratio is shifted stepwise in a suitable manner in accordance with the state of travel of the vehicle.

Besides, according to the control device for the vehicle power transmission device of the invention, since the electrical differential portion is constructed of two ore more electric motors and a planetary gear device, the rotation speeds of the rotating elements of the planetary gear device can be suitably controlled by controlling the electric motors.

Besides, according to the control device for the vehicle power transmission device of the invention, since the electrical differential portion operates as a continuously variable transmission mechanism due to the control of operation of the first electric motor, a wide range of speed change ratio can be steplessly or continuously obtained due to the combination of the speed change ratio of the electrical differential portion and the speed change ratio of the ratio shift portion.

Another aspect of the invention is a control method for a vehicle power transmission device that includes an electrical differential portion that includes a differential mechanism and a first electric motor and in which a differential state between rotation speed of an input shaft and rotation speed of an output shaft is controlled through control of operation of the first electric motor that is linked to a rotating element of the differential mechanism so as to be capable of power transmission, and an engagement device that constitutes a portion of a power transmission path between the electrical differential portion and a driving wheel, the control method including: restricting the differential state of the differential mechanism; and operating the lock mechanism when an engine stop control is executed while the engagement device is in a non-engaged state.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 is an operation diagram illustrating a relation between the ratio shifting operation and the combination of the operation of hydraulic type friction engagement devices used for the ratio shifting operation in the case where the driving device of the hybrid vehicle of the embodiment shown in FIG. 1 is shifted in transmission ratio steplessly or stepwise;

DETAILED DESCRIPTION OF EMBODIMENTS

Figure 1:
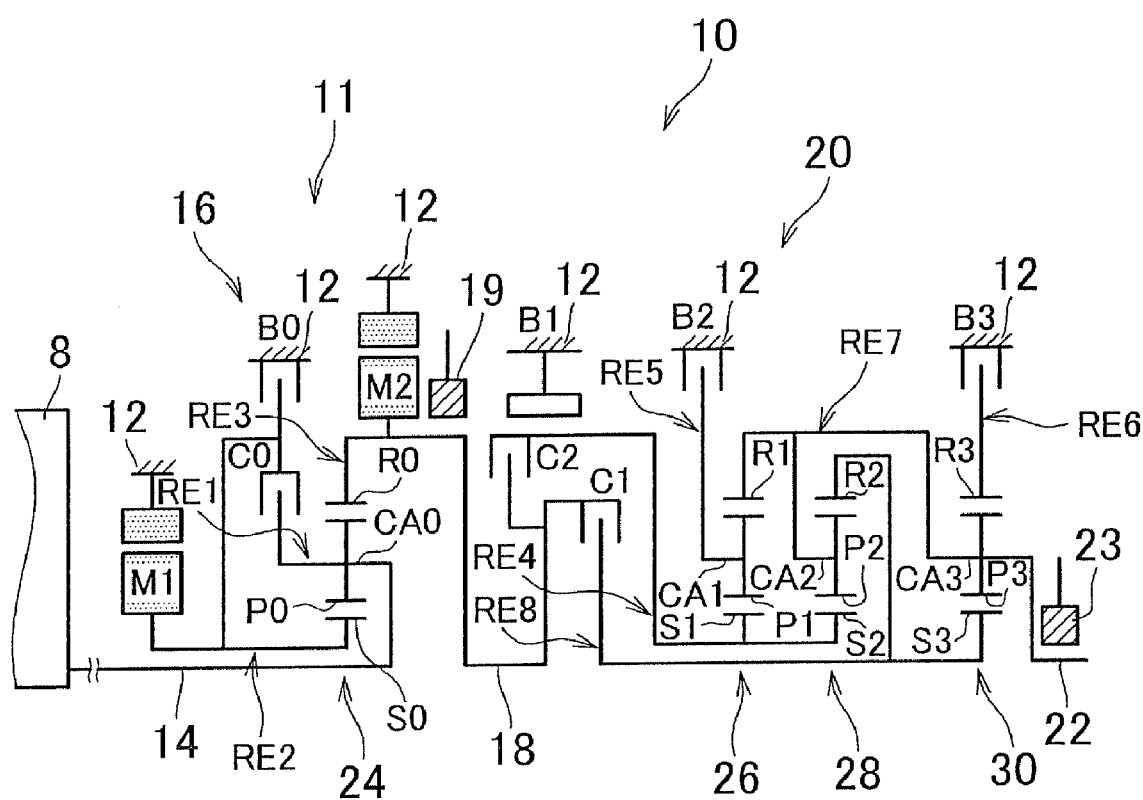
FIG. 1 is a skeleton diagram illustrating a construction of a driving device of a hybrid vehicle as an embodiment of the invention.

FIG. 1 is a skeleton diagram illustrating a transmission mechanism 10 that constitutes a portion of a power transmission device for a hybrid vehicle to which the control device of the invention is applied. In FIG. 1, the transmission mechanism 10 includes an input shaft 14 as an input rotating member, a differential portion 11 that is linked directly to the input shaft 14 or indirectly thereto via a pulsation absorbing damper (vibration damping device) (not shown), an automatic ratio shift portion 20 as a ratio shift portion that functions as a stepped-ratio transmission that is linked in series in the power transmission path between the differential portion 11 and driving wheels 38 (see FIG. 6) via a transmission member (corresponds to an output shaft of a differential mechanism) 18, and an output shaft 22 as an output rotating member that is linked to the automatic ratio shift portion 20. These members of the transmission mechanism 10 are disposed on a common axis within a transmission case 12 (hereinafter, referred to as "the case 12") provided as a non-rotating member attached to a vehicle body. This transmission mechanism 10 is suitably used in, for example, an FR (front engine, rear wheel drive) type vehicle in which the mechanism 10 is longitudinally mounted. The transmission mechanism 10 is provided between a pair of driving wheels 38 and an internal combustion engine 8, for example, a gasoline engine, a diesel engine, etc., provided as a vehicle-running drive force source which is directly linked to the input shaft 14 or indirectly linked thereto via a pulsation absorbing damper (not shown) (see FIG. 6). The transmission mechanism 10 transmits power from the engine 8 to the left and right-side driving wheels 38, sequentially via a differential gear device (final speed reducer) 36, a pair of axles, etc., which each form a portion of the power transmission path.

In the transmission mechanism 10 of the first embodiment, the engine 8 and the differential portion 11 are directly coupled. Being directly coupled herein means being linked without the intervention of a fluid type transmission device, such as a torque converter, a fluid coupling, etc.; for example, the aforementioned linkage via the pulsation absorbing damper or the like is included in this direct coupling. Incidentally, the transmission mechanism 10 is constructed symmetrically about its axis, and in the skeleton diagram of FIG. 1, the lower half thereof is omitted from illustration.

The differential portion 11 includes a first electric motor M1, a power distribution mechanism 16 which is a mechanical mechanism that mechanically distributes the output of the engine 8 input to the input shaft 14 and which distributes the output of the engine 8 to the first electric motor M1 and to the transmission member 18, and a second electric motor M2 provided so as to rotate integrally with the transmission member 18. The differential portion 11 can be regarded as an electrical differential portion in terms of the differential state being altered through the use of the first electric motor M1. Incidentally, the second electric motor M2 may be provided in any portion that constitutes a power transmission path from the transmission member 18 to the driving wheels 38. Besides, the first electric motor M1 and the second electric motor M2 are so-called motor-generators that also have an electricity generating function. Furthermore, the first electric motor M1 is equipped at least with a generator (electricity generation) function for generating a reaction force, and the second electric motor M2 is equipped at least with a motor (electric motor) function for outputting drive force as a vehicle-running drive force source.

The power distribution mechanism 16 mainly includes a single-pinion type differential portion planetary gear device 24 that has a predetermined gear ratio ρ of, for example, about "0.418", as well as a switching clutch C0 and a switching brake B0. This differential portion planetary gear device 24 includes as rotating elements (elements) a differential portion sun gear S0, differential portion planetary gears P0, a differential portion carrier CA0 that supports the differential portion planetary gears P0 so that each planetary gear is rotatable about its own axis as well as revolvable, and a differential portion ring gear R0 that meshes with the differential portion sun gear S0 via the differential portion planetary gears P0. If the number of teeth of the differential portion sun gear S0 is ZS0 and the number of teeth of the differential portion ring gear R0 is ZR0, the aforementioned gear ratio ρ0 is ZS0/ZR0.

In this power distribution mechanism 16, the differential portion carrier CA0 is linked to the input shaft 14, that is, to the engine 8, and the differential portion sun gear S0 is linked to the first electric motor M1, and the differential portion ring gear R0 is linked to the transmission member 18. Besides, the switching brake B0 is provided between the differential portion sun gear S0 and the case 12, and the switching clutch C0 is provided between the differential portion sun gear S0 and the differential portion carrier CA0. When the switching clutch C0 and the switching brake B0 are released, the power distribution mechanism 16 is caused to be in a state in which differential motion can be performed, that is, a differential state in which the differential motion occurs, as three of the elements of the differential portion planetary gear device 24, that is, the differential portion sun gear S1, the differential portion carrier CA1 and the differential portion ring gear R1, are allowed to rotate relatively to each other. Therefore, the output of the engine 8 is distributed between the first electric motor M1 and the transmission member 18, and the electric energy that the first electric motor M1 generates from a portion of the output of the engine 8 distributed thereto is electrically stored or is used to rotationally drive the second electric motor M2. Thus, the differential portion 11 (the power distribution mechanism 16) is caused to function as an electrical differential device; for example, the differential portion 11 is caused to be in a so-called stepless or continuously variable-ratio transmission state (electrical CVT state), in which the rotation of the transmission member 18 is continuously changed despite a predetermined rotation speed of the engine 8. That is, when the power distribution mechanism 16 is caused to be in the differentia state, the differential portion 11 is also caused to be in the differential state; specifically, the differential portion 11 is caused to be in a continuously variable-ratio transmission state in which the differential portion 11 functions as an electrical continuously variable transmission whose speed change ratio γ0 (the rotation speed $N_{IN}$ of the input shaft 14/the rotation speed $N_{18}$ of the transmission member 18) is continuously changed from a minimum value γ0min to a maximum value γ0max. Thus, as the states of operation of the first electric motor M1 linked to the differential portion sun gear S0 and the second electric motor M2 linked to the differential portion ring gear R0 are controlled, the differential state between the rotation speed of the input shaft 14 and the rotation speed of the transmission member 18, which functions as a the output shaft, is controlled. Incidentally, the rotation speed $N_{18}$ of the transmission member 18 is detected by a resolver 19 that is provided in the vicinity of the second electric motor M2.

When, from the foregoing state, the switching clutch C0 or the switching brake B0 is engaged, the power distribution mechanism 16 is caused to be in a non-differential state in which the foregoing differential motion is not performed, that is, the differential motion is impossible. Concretely, when the switching clutch C0, which functions as a lock mechanism in the invention, is engaged and, therefore, the differential portion sun gear S0 and the differential portion carrier CA0 are integrally engaged, the power distribution mechanism 16 is caused to be in a locked state in which three of the elements of the differential portion planetary gear device 24, that is, the differential portion sun gear S0, the differential portion carrier CA0 and the differential portion ring gear R0, are rotated together, that is, integrally rotated, in other words, into the non-differential state in which the differential motion is impossible, and therefore the differential portion 11 is also caused to be in the non-differential state. Besides, in this state, since the rotation speed of the engine 8 and the rotation speed of the transmission member 18 are equal, the differential portion 11 (the power distribution mechanism 16) is caused to be in a fixed-ratio transmission state, that is, a stepped-ratio transmission state, in which the speed change ratio γ0 is fixed at "1". When the switching brake B0 is engaged, replacing the switching clutch C0, so that the differential portion sun gear S0 is linked or coupled to the case 12, the power distribution mechanism 16 is caused to be in the locked state in which the differential portion sun gear S0 does not rotate, that is, the non-differential state in which the differential motion is impossible, and therefore the differential portion 11 is also caused to be in the non-differential state. Besides, since the differential portion ring gear R0 is rotated at higher speed as than the differential portion carrier CA0, the power distribution mechanism 16 functions as a speed-increasing mechanism, and therefore the differential portion 11 (the power distribution mechanism 16) is caused to be in a fixed-ratio transmission state, that is, a stepped-ratio transmission state, in which the differential portion 11 functions as a speed-increasing transmission, with the speed change ratio γ0 fixed at a value smaller than "1", for example, about "0.7".

Thus, in this embodiment, the switching clutch C0 and the switching brake B0 function as a differential state switch device that selectively switches the state of ratio shift of the differential portion 11 (the power distribution mechanism 16) between the differential state, that is, the non-locked state, and the non-differential state, that is, the locked state, in other words, between the differential state in which the differential portion 11 (the power distribution mechanism 16) can operate as an electrical differential device, for example, the continuously variable-ratio transmission state in which the differential portion 11 is capable of a stepless or continuously variable-ratio transmission operation of operating as a continuously variable transmission whose speed change ratio can be continuously changed, and a state of ratio shift in which the differential portion 11 does not perform an electrical continuously variable transmission operation, for example, the locked state in which the differential portion 11 is not operated as a continuously variable transmission, but the continuously variable-ratio transmission operation is made inactive and the change in the speed change ratio is locked to a fixed ratio, that is, a fixed-ratio transmission state (non-differential state) in which the differential portion 11 does not perform the electrical continuously variable-ratio transmission operation of operating as a one-step or two-or-more-step transmission with one kind or two or more kinds of speed change ratios, that is, is incapable of the electrical continuously variable-ratio transmission operation, in other words, a fixed-ratio transmission state in which the differential portion 11 operates as a transmission with one or more steps of fixed speed change ratios.

The automatic ratio shift portion 20 corresponding to the ratio shift portion constitutes a power transmission path between the differential portion 11 and the driving wheels 38, and includes the single-pinion type first planetary gear device 26, the single-pinion type second planetary gear device 28, and the single-pinion type third planetary gear device 30. The first planetary gear device 26 includes a first sun gear S1, first planetary gears P1, a first carrier CA1 that supports the first planetary gears P1 so that each first planetary gear is rotatable about its axis as well as revolvable, and a first ring gear R1 that meshes with the first sun gear S1 via the first planetary gears P1. The first planetary gear device 26 has a predetermined gear ratio ρ1 of, for example, about "0.562". The second planetary gear device 28 includes a second sun gear S2, second planetary gears P2, a second carrier CA2 that supports the second planetary gears P2 so that each second planetary gear is rotatable about its own axis as well as revolvable, and a second ring gear R2 that meshes with the second sun gear S2 via the second planetary gears P2. The second planetary gear device 28 has a predetermined gear ratio ρ2 of, for example, about "0.425". The third planetary gear device 30 includes a third sun gear S3, third planetary gears P3, a third carrier CA3 that supports the third planetary gears P3 so that each third planetary gear is rotatable about its own axis as well as revolvable, and a third ring gear R3 that meshes with the third sun gear S3 via the third planetary gears P3. The third planetary gear device 30 has a predetermined gear ratio ρ3 of, for example, about "0.421". If the number of teeth of the first sun gear S1 is ZS1 and the number of teeth of the first ring gear R1 is ZR1 and the number of teeth of the second sun gear S2 is ZS2 and the number of teeth of the second ring gear R2 is ZR2 and the number of teeth of the third sun gear S3 is ZS3 and the number of teeth of the third ring gear R3 is ZR3, the foregoing gear ratio ρ1 is ZS1/ZR1 and the foregoing gear ratio ρ2 is ZS2/ZR2 and the foregoing gear ratio ρ3 is ZS3/ZR3.

In the automatic ratio shift portion 20, the first sun gear S1 and the second sun gear S2 are integrally interlinked, and are selectively linked to the transmission member 18 via the second clutch C2 and is also selectively linked to the case 12 via the first brake B1. The first carrier CA1 is selectively linked to the case 12 via a second brake B2, and the third ring gear R3 is selectively linked to the case 12 via a third brake B3. Furthermore, the ring gear R1, the second carrier CA2 and the third carrier CA3 are integrally interlinked, and are linked to the output shaft 22. The second ring gear R2 and the third sun gear S3 are integrally interlinked, and are selectively linked to the transmission member 18 via a first clutch C1. In this manner, the automatic ratio shift portion 20 and the transmission member 18 are selectively interlinked via at least one of the first clutch C1 and the second clutch C2, which are used to establish speed change steps of the automatic ratio shift portion 20. In other words, the first clutch C1 and the second clutch C2 function as an engagement device that selectively switches the power transmission path between the transmission member 18 and the automatic ratio shift portion 20, that is, the power transmission path between the differential portion 11 (the transmission member 18) and the driving wheels 38, between a power transmission-capable state in which the power transmission through the power transmission path is made possible, and a power transmission disconnected state (neutral state) in which the power transmission through the power transmission path is disconnected. Specifically, as at least one of the first clutch C1 and the second clutch C2 is engaged, the foregoing power transmission path is caused to be in the power transmission-capable state. As both the first clutch C1 and the second clutch C2 are released, the power transmission path is caused to be in the power transmission disconnected state (neutral state).

The-switching clutch C0, the first clutch C1, the second clutch C2, the switching brake B0, the first brake B1, the second brake B2 and the third brake B3 are hydraulic type friction engagement devices that are often used in related-art vehicle stepped-ratio type automatic transmissions. These clutches brakes are each made up of a wet multiplate clutch in which a plurality of friction discs superposed on each other are pressurized against each other by a hydraulic actuator, a band brake in which an end of one or two bands wrapped around an outer peripheral surface of a rotating drum is pulled tight by a hydraulic actuator, etc. Each of the clutches and brakes is provided for selectively linking both side members between which the clutch or brake is disposed. Incidentally, the first clutch C1, the second clutch C2, the first brake B1, the second brake B2, and the third brake B3, which are portions of the automatic ratio shift portion 20, correspond to engagement devices in the invention.

In the transmission mechanism 10 constructed as described above, the switching clutch C0, the first clutch C1, the second clutch C2, the switching brake B0, the first brake B1, the second brake B2, and the third brake B3 are selectively engaged, for example, as shown in the engagement operation table of FIG. 2, so as to selectively establish one of the first-speed gear step (first speed change step) to the fifth-speed gear step (fifth speed change step) or a reverse-travel gear step (reverse travel speed change step) or a neutral. Thus, the speed change ratio γ (=input shaft rotation speed $N_{IN}$/ output shaft rotation speed $N_{OUT}$) that changes at substantially equal ratios can be obtained for each gear step. In particular, in this embodiment, the power distribution mechanism 16 is provided with the switching clutch C0 and the switching brake B0, and the differential portion 11 is capable of forming a fixed-ratio transmission state in which the differential portion 11 operates a transmission with a fixed speed change ratio, in addition to the above-described continuously variable-ratio transmission state in which the differential portion 11 operates as a continuously variable transmission, as one of the switching clutch C0 and the switching brake B0 is engaged. Therefore, the transmission mechanism 10 forms a stepped-ratio transmission state in which the differential portion 11 caused to be in the fixed-ratio transmission state by engaging one of the switching clutch C0 and the switching brake B0 achieves and the automatic ratio shift portion 20 operate together as a stepped-ratio transmission, and also forms a continuously variable-ratio transmission state in which the differential portion 11 caused to be in the continuously variable-ratio transmission state by causing both the switching clutch C0 and the switching brake B0 to be unengaged, and the automatic ratio shift portion 20 operate together as an electrical continuously variable transmission. In other words, the transmission mechanism 10 is switched to the stepped-ratio transmission state by engaging one of the switching clutch C0 and the switching brake B0, and the transmission mechanism 10 is switched to a continuously variable-ratio transmission state by causing the switching clutch C0 and the switching brake B0 to be non-engaged. Besides, the differential portion 11 can also be said to be a transmission that is capable of being switched between the stepped-ratio transmission state and the continuously variable-ratio transmission state. Incidentally, the output shaft rotation speed $N_{OUT}$ is detected by a rotation speed sensor 23 that is provided on the output shaft 22. The rotation speed sensor 23 detects the rotation speed $N_{OUT}$ of the output shaft 22, and is also able to detect the rotating direction of the output shaft 22, and detects the traveling direction of the vehicle during the neutral state.

For example, in the case where the transmission mechanism 10 functions as a stepped-ratio transmission, the gear steps are established as shown in FIG. 2. That is, the engagement of the switching clutch C0, of the first clutch C1 and of the third brake B3 establishes a first speed gear step whose speed change ratio γ1 is the maximum value, for example, about "3.357". The engagement of the switching clutch C0, of the first clutch C1 and of the second brake B2 establishes a second-speed gear step whose speed change ratio γ2 is a value that is smaller than that of the first speed gear step, for example, about "2.180", and the engagement of the switching clutch C0, of the first clutch C1 and of the first brake B1 establishes a third-speed gear step whose speed change ratio γ3 is a value that is smaller than that of the second-speed gear step, for example, about "1.424", and the engagement of the switching clutch C0, of the first clutch C1 and of the second clutch C2 establishes a fourth-speed gear step whose speed change ratio γ4 is a value that is smaller than that of the third-speed gear step, for example, about "1.000". The engagement of the first clutch C1, of the second clutch C2 and of the switching brake B0 establishes a fifth-speed gear step whose speed change ratio γ5 is a value that is smaller than that of the fourth-speed gear step, for example, about "0.705". Besides, the engagement of the second clutch C2 and of the third brake B3 establishes a reverse-travel gear step whose speed change ratio γR is a value that is between that of the first speed gear step and that of the second-speed gear step, for example, about "3.209". In addition, the neutral "N" state can be achieve, for example, by releasing all the clutches and the brakes C0, C1, C2, B0, B1, B2, and B3.

However, in the case where the transmission mechanism 10 functions as a continuously variable transmission, both the switching clutch C0 and the switching brake B0 shown in the engagement table shown in FIG. 2 are released. Due to this operation, the differential portion 11 functions as a continuously variable transmission, and the automatic ratio shift portion 20 connected in series with the differential portion 11 functions as a stepped-ratio transmission, so that, for each of the first speed, the second speed, the third speed and the fourth speed, the rotation speed input to the automatic ratio shift portion 20, that is, the rotation speed of the transmission member 18, is steplessly changed, so that each gear step is provided with a stepless shift width of speed change ratio. Therefore, the speed change ratio can be steplessly and continuously changed in the intervals between the gear steps, so that the total speed change ratio (overall speed change ratio) γT can be obtained in a stepless fashion.

Figure 3:
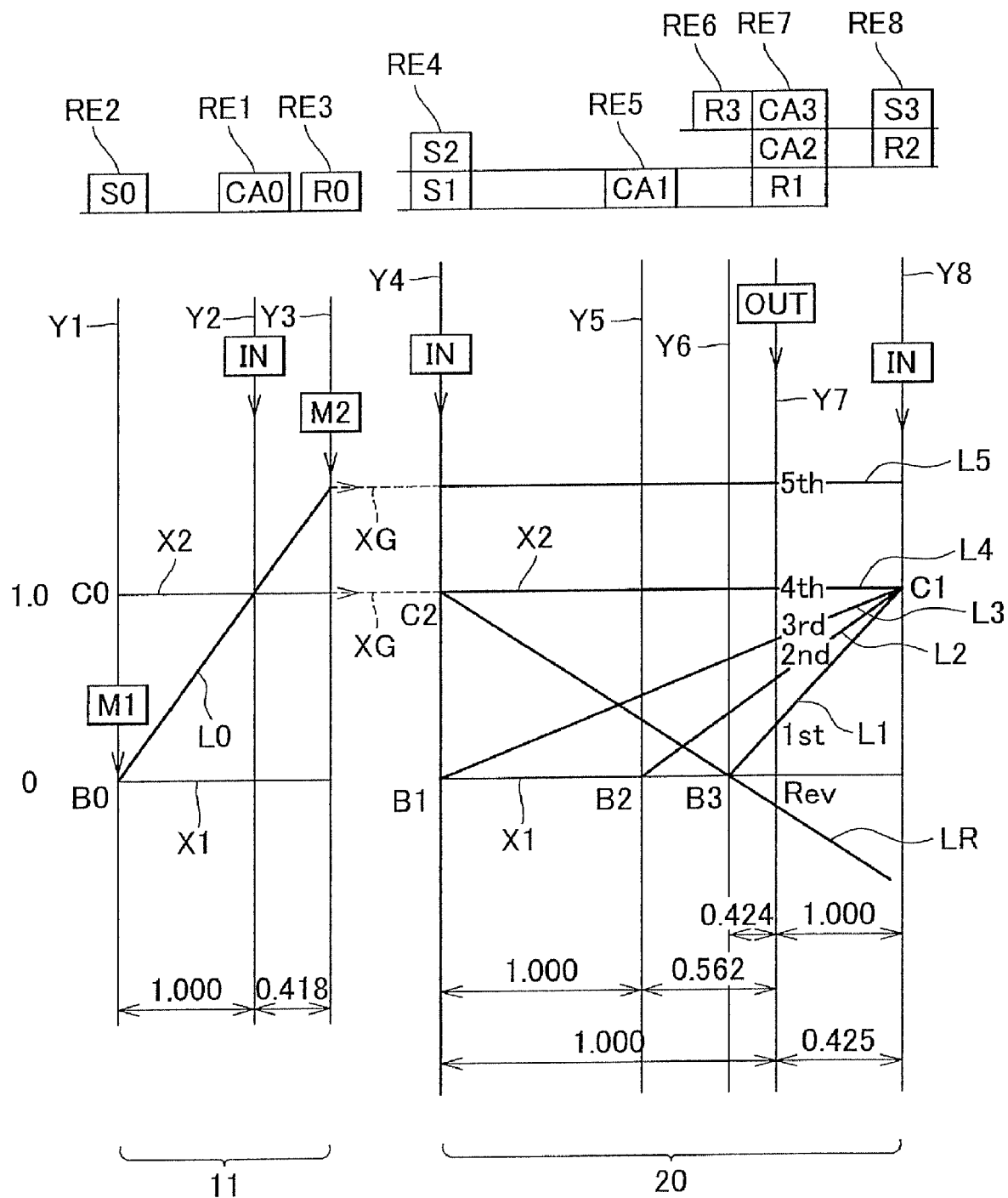
FIG. 3 is an alignment chart illustrating the relative rotation speed of each gear step in the case where the driving device of the hybrid vehicle of the embodiment shown in FIG. 1 is shifted in ratio stepwise.

FIG. 3 shows an alignment chart in which relative relations of rotation speeds of rotating elements that are in different linkage states for each gear step can be presented in straight lines in the transmission mechanism 10 constructed of the differential portion 11 that functions as a stepless ratio shift portion or a first ratio shift portion, and the automatic ratio shift portion 20 that functions as a stepped ratio shift portion or a second ratio shift portion. The alignment chart in FIG. 3 is of a two-dimensional coordinate system made up of a horizontal axis that shows relationships among the gear ratios ρ of the planetary gear devices 24, 26, 28, 30, and a vertical axis that shows relative rotation speeds. In the chart, a horizontal line X1 that is a lowermost one of the three horizontal lines shows a rotation speed of zero, and an upper horizontal line X2 shows a rotation speed of "1.0", which is the rotation speed $N_E$ of the engine 8 linked to the input shaft 14, and a horizontal line XG shows the rotation speed of the transmission member 18.

Besides, three vertical lines Y1, Y2, Y3 corresponding to three elements of the power distribution mechanism 16 constituting the differential portion 11 show the relative rotation speeds of the differential portion sun gear S0 corresponding to a second rotating element (second element) RE2, the differential portion carrier CA0 corresponding to a first rotating element (first element) RE1, and the differential portion ring gear R0 corresponding to a third rotating element (third element) RE3, in that order from the left-hand side. The intervals between the three vertical lines are determined according to the gear ratio ρ0 of the differential portion planetary gear device 24. Furthermore, five vertical lines Y4, Y5, Y6, Y7, Y8 regarding the automatic ratio shift portion 20 represent the first sun gear S1 and the second sun gear S2 that correspond to a fourth rotating element (fourth element) RE4 and that are interlinked with each other, the first carrier CA1 corresponding to a fifth rotating element (fifth element) RE5, the third ring gear R3 corresponding to a sixth rotating element (sixth element) RE6, the first ring gear R1, the second carrier CA2 and the third carrier CA3 that correspond to a seventh rotating element (seventh element) RE7 and that are interlinked with each other, and the second ring gear R2 and the third sun gear S3 that correspond to an eighth rotating element (eighth element) RE8 and that are interlinked with each other, respectively. The intervals between the vertical lines are respectively determined according to the gear ratios ρ1, ρ2, ρ3 of the first, second, and third planetary gear devices 26, 28, 30. In the relationship among the vertical lines in the alignment chart, if the interval between the sun gear and the carrier is set at an interval corresponding to "1", the interval between the carrier and the ring gear becomes an interval corresponding to the gear ratio ρ of the planetary gear device. Specifically, in the differential portion 11, the interval between the vertical line Y1 and the vertical line Y2 is set at an interval that corresponds to "1", and the interval between the vertical line Y2 and the vertical line Y3 is set at an interval that corresponds to the gear ratio ρ0. Besides, as for each of the first, second and third planetary gear devices 26, 28, 30 of the automatic ratio shift portion 20, the interval between the vertical lines of the sun gear and the carrier is set at an interval that corresponds to "1", and the interval between the vertical lines of the carrier and the ring gear is set at an interval that corresponds to ρ.

The transmission mechanism 10 of this first embodiment, if described through the use of the alignment chart in FIG. 3, is constructed as follows. That is, in the power distribution mechanism 16 (the differential portion 11), the first rotating element RE1 (the differential portion carrier CA0) of the differential portion planetary gear device 24 is linked to the input shaft 14, that is, to the engine 8, and is selectively linked to the second rotation element RE2 (the differential portion sun gear S0) via the switching clutch C0. The second rotating element RE2 is linked to the first electric motor M1, and is selectively linked to the case 12 via the switching brake B0. The third rotating element (the differential portion ring gear R0) RE3 is linked to the transmission member 18 and to the second electric motor M2. Thus, rotation of the input shaft 14 is transmitted (input) to the automatic ratio shift portion (stepped ratio shift portion) 20 via the transmission member 18. In the alignment chart, a diagonal straight line L0 passing through the intersection point between the lines Y2 and X2 shows a relation between the rotation speed of the differential portion sun gear S0 and the rotation speed of the differential portion ring gear R0.

For example, in the case where the state of ratio shift has been switched to the continuously variable-ratio transmission state (differential state) by releasing the switching clutch C0 and the switching brake B0, if the rotation speed of the differential portion sun gear S0, which is shown by the intersection point of the straight line L0 and the vertical line Y1, is raised or lowered by controlling the rotation speed of the first electric motor M1, then the rotation speed of the differential portion carrier CA0, which is shown by the intersection point of the straight line L0 and the vertical line Y2, is raised or lowered provided that the rotation speed of the differential portion ring gear R0, which is restrained by the vehicle speed V, is substantially constant. Besides, in the case where the differential portion sun gear S0 and the differential portion carrier CA0 are interlinked by engaging the switching clutch C0, the power distribution mechanism 16 is caused to be in the non-differential state in which the foregoing three rotating elements integrally rotate, which means that the straight line L0 and the horizontal line X2 coincide with each other, and the transmission member 18 is rotated at the same rotation speed as the engine rotation speed $N_E$. In the case where the differential portion sun gear S0 has been stopped from rotating by engaging the switching brake B0, the power distribution mechanism 16 is caused to be in a non-differential state in which the power distribution mechanism 16 functions as a speed-increasing mechanism, and therefore the straight line L0 becomes as shown in FIG. 3. Thus, the rotation speed of the differential portion ring gear R0, that is, the rotation speed of the transmission member 18, which is shown by the intersection point of the straight line L0 and the vertical line Y3, is made higher than the engine rotation speed $N_E$, and is input to the automatic ratio shift portion 20.

Besides, in the automatic ratio shift portion 20, the fourth rotating element RE4 is selectively linked to the transmission member 18 via the second clutch C2, and is also selectively linked to the case 12 via the first brake B1, and the fifth rotating element RE5 is selectively linked to the case 12 via the second brake B2, and the sixth rotating element RE6 is selectively linked to the case 12 via the third brake B3, and the seventh rotating element RE7 is linked to the output shaft 22, and the eighth rotating element RE8 is selectively linked to the transmission member 18 via the first clutch C1.

In the automatic ratio shift portion 20, when the first clutch C1 and the third brake B3 are engaged as shown in FIG. 3, the rotation speed of the output shaft 22 at the first speed is shown by the intersection point between the vertical line Y7 showing the rotation speed of the seventh rotating element RE7 linked to the output shaft 22 and the diagonal straight line L1 passing through the intersection point between the horizontal line X1 and the vertical line Y6 showing the rotation speed of the sixth rotating element RE6 and also through the intersection point between the horizontal line X2 and the vertical line Y8 showing the rotation speed of the eighth rotating element RE8. Likewise, the rotation speed of the output shaft 22 at the second speed is shown by the intersection point between the vertical line Y7 showing the rotation speed of the seventh rotating element RE7 linked to the output shaft 22 and a diagonal straight line L2 determined by the engagement of the first clutch C1 and of the second brake B2. The rotation speed of the output shaft 22 at the third speed is shown by the intersection point between the vertical line Y7 showing the rotation speed of the seventh rotating element RE7 linked to the output shaft 22 and a diagonal straight line L3 determined by the engagement of the first clutch C1 and of the first brake B1. The rotation speed of the output shaft 22 at the fourth speed is shown by the intersection point between the vertical line Y7 showing the rotation speed of the seventh rotating element RE7 linked to the output shaft 22 and a horizontal straight line LA determined by the engagement of the first clutch C1 and of the second clutch C2. At the first speed to the fourth speed, since the switching clutch C0 is engaged, the power from the differential portion 11, that is, from the power distribution mechanism 16, is input to the eighth rotating element RE8 at the same rotation speed as the engine rotation speed $N_E$. However, if the switching brake B0 is engaged replacing the switching clutch C0, the power from the differential portion 11 is input at a rotation speed higher than the engine rotation speed $N_E$, and therefore the rotation speed of the output shaft 22 at the fifth speed is shown by the intersection point between the vertical line Y7 showing the rotation speed of the seventh rotating element RE7 linked to the output shaft 22 and a straight line L5 determined by the engagement of the first clutch C1, the second clutch C2 and the switching brake B0.

Figure 4:
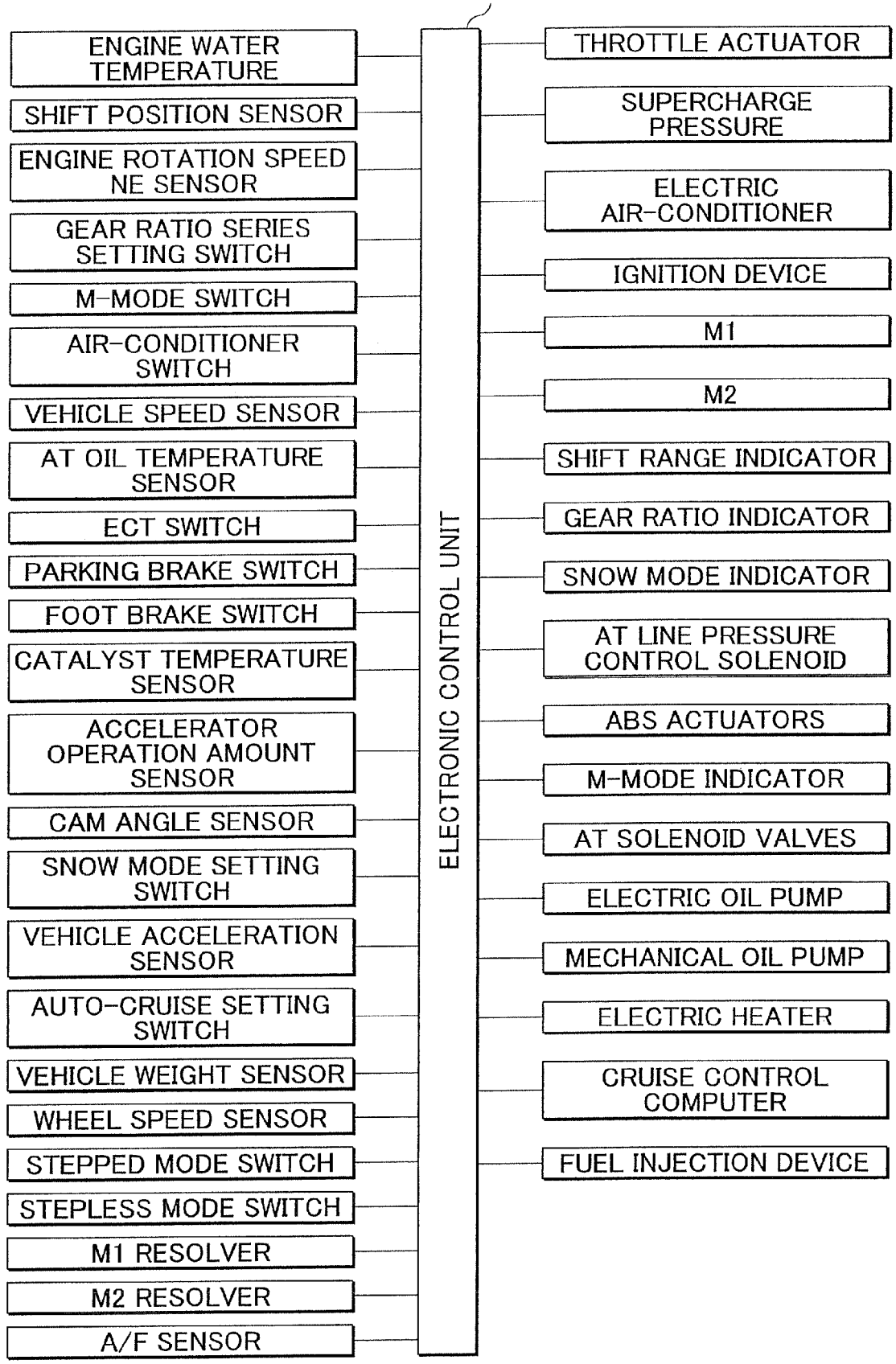
FIG. 4 is a diagram illustrating input/output signals of an electronic control unit provided in the driving device of the embodiment shown in FIG. 1.

FIG. 4 shows an example of signals input to an electronic control unit 40 that is a control device for controlling the transmission mechanism 10 that forms a portion of the hybrid vehicle driving device in accordance with the invention, and signals output from the electronic control unit 40. This electronic control unit 40 includes a so-called microcomputer made up of a CPU, a ROM, a RAM, input/output interfaces, etc. By performing signal processing in accordance with programs pre-stored in the ROM while utilizing the temporary storage function of the RAM, the electronic control unit 40 executes driving controls, such as hybrid drive controls regarding the engine 8 and the first electric motor M1, the second electric motor M2, the ratio shift control of the automatic ratio shift portion 20, etc.

The electronic control unit 40 is supplied from various sensors, switches, etc., shown in FIG. 4 with signals, including a signal representing the engine water temperature $TEMP_W$, a signal representing the shift position $P_{SH}$, a signal representing the rotation speed $N_{M1}$ of the first electric motor M1, a signal representing the rotation speed $N_{M2}$ of the second electric motor M2, a signal representing the engine rotation speed $N_E$ that is the rotation speed of the engine 8, a signal showing the gear ratio series setting value, a signal commanding an M mode (manual shift travel mode), an air-conditioner signal showing the operation of the air-conditioner, a signal representing the vehicle speed V corresponding to the rotation speed $N_{OUT}$ of the output shaft 22, an oil temperature signal showing the operation oil temperature of the automatic ratio shift portion 20, a signal showing a parking brake operation, a signal showing a foot brake operation, a catalyst temperature signal showing the catalyst temperature, an accelerator operation amount signal showing the operation amount Acc of the accelerator pedal corresponding to a driver's requested output amount, a cam angle signal, a snow mode setting signal showing the setting of the snow mode, an acceleration signal showing the longitudinal acceleration of the vehicle, an automatic cruise signal showing the automatic cruise travel, a vehicle weight signal showing the weight of the vehicle, tire wheel speed signals showing the wheel speeds of the tire wheels, a signal showing the air-fuel ratio A/F of the engine 8, a signal showing the throttle valve degree of opening $\theta_{TH}$, etc.

The electronic control unit 40 outputs various signals, including control signals to an engine output control device 43 (see FIG. 6) that controls the engine output, for example, a drive signal to a throttle actuator 97 that manipulates the opening degree θTH of an electronic throttle valve 96 provided in an intake pipe 95 of the engine 8, a fuel supply amount signal that controls the amount of fuel supplied by a fuel injection device 98 into each cylinder of the engine 8, or an ignition signal that commands the timing of the ignition performed by an ignition device 99 in the engine 8, a supercharge pressure adjustment signal for adjusting the supercharge pressure, an electric air-conditioner drive signal for operating an electric air-conditioner, a command signal that commands the operation of the electric motors M1 and M2, a shift position (operation position) display signal for operating a shift indicator, a gear ratio display signal for displaying the gear ratio, a snow mode display signal for displaying that the snow mode is on, an ABS operation signal for operating an ABS actuator that prevents slippage of wheels during braking, an M-mode display signal that displays that the M mode has been selected, a valve command signal that operates electromagnetic valves that are included in a hydraulic control circuit 42 (see FIG. 6) in order to control the hydraulic actuators of hydraulic type friction engagement devices of the differential portion 11 or of the automatic ratio shift portion 20, a drive command signal for operating an electric hydraulic pump that is an oil pressure source for the hydraulic control circuit 42, a signal for driving an electric heater, a signal to a computer for the cruise control, etc.

Figure 5:
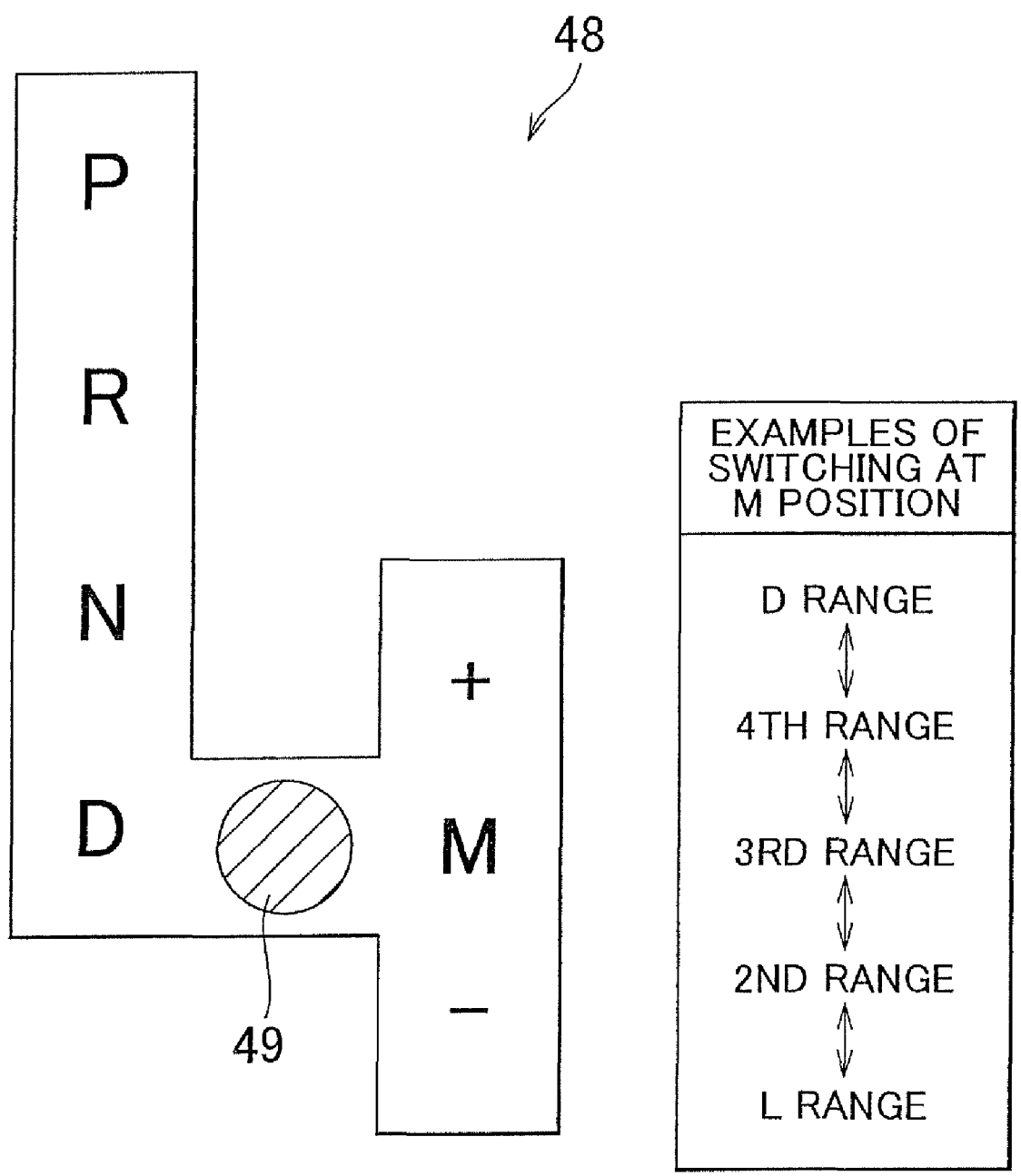
FIG. 5 is a diagram showing an example of a shift operation device as a switching device that manually select one of a plurality of types of shift positions $P_{SH}$.

FIG. 5 is a diagram showing an example of a shift operation device 48 as a switch device for switching among a plural kinds of shift positions $P_{SH}$ by manual operation. This shift operation device 48 includes a shift lever 49 that is disposed, for example, at a side of a driver's seat, and that is operated in order to select an appropriate one of the plural kinds of shift positions $P_{SH}$.

The shift lever 49 is provided so as to be manually operated to a parking position "P (Parking)" for bringing about a neutral state in which the power transmission path in the transmission mechanism 10, that is, in the automatic ratio shift portion 20, is disconnected, and for locking the output shaft 22 of the automatic ratio shift portion 20, a reverse travel position "R (Reverse)" for reverse travel, a neutral position "N (Neutral)" for bringing about a neutral state in which the power transmission path in the transmission mechanism 10 is disconnected, a forward travel automatic shift position "D (Drive)" for establishing an automatic shift mode of executing an automatic ratio shift control within the range of change of the total speed change ratio $\gamma T$ that can be achieved by the transmission mechanism 10, or a forward travel manual shift position "M (Manual)" for establishing a manual shift travel mode (manual mode) of setting a so-called shift range that restricts the high speed-side speed change steps in the automatic ratio shift control.

In concert with the manual operation of the shift lever 49 to any of the shift positions $P_{SH}$, the hydraulic control circuit 42, for example, is electrically switched so as to establish a corresponding one of the reverse travel gear step "R", the neutral "N", the various speed change steps of the forward travel gear steps "D", etc.

Of the shift positions $P_{SH}$ shown as the "P" to "M" positions in the above-description, the "P" position and the "N" position are non-travel positions each of which is selected when the vehicle is not to be run, and are also non-driving positions for selecting a switch of the power transmission pathway to a power transmission disconnected state based on the first clutch C1 and the second clutch C2 in which the vehicle cannot be driven as the power transmission path in the automatic ratio shift portion 20 is disconnected; that is, both the first clutch C1 and the second clutch C2 are released, as shown in the engagement operation table of FIG. 2. Besides, the "R" position, the "D" position and the "M" position are travel positions each of which is selected when the vehicle is to be run, and are driving positions for selecting a switch of the power transmission pathway to a power transmission-capable state based on the first clutch C1 and/or the second clutch C2 in which the vehicle can be driven as the power transmission path in the automatic ratio shift portion 20 is connected; that is, at least one of the first clutch C1 and the second clutch C2 is engaged, as shown in the engagement operation table of FIG. 2.

Concretely, when the shift lever 49 is manually operated from the "P" position or the "N" position to the "R" position, the second clutch C2 is engaged, so that the power transmission path in the automatic ratio shift portion 20 is changed from the power transmission disconnected state (neutral state) to the power transmission-capable state. When the shift lever 49 is manually operated from the "N" position to the "D" position, at least the first clutch C1 is engaged, so that the power transmission path in the automatic ratio shift portion 20 is changed from the power transmission disconnected state to the power transmission-capable state. Besides, when the shift lever 49 is manually operated from the "R" position to the "P" position or the "N" position, the second clutch C2 is released, so that the power transmission path in the automatic ratio shift portion 20 is changed from the power transmission-capable state to the power transmission disconnected state. When the shift lever 49 is manually shifted from the "D" position to the "N" position, the first clutch C1 and the second clutch C2 are released, so that the power transmission path in the automatic ratio shift portion 20 is changed from the power transmission-capable state to the power transmission disconnected state.

The "M" position is provided, for example, at the same position as the "D" position in the longitudinal direction of the vehicle, and adjacent to the "D" position in the width direction of the vehicle. When the position lever 49 is operated to the "M" position, one of the "D" range to the "L" range is changed according to the operation of the shift lever 49. Concretely, the "M" position is provided with an upshift position "+" and a downshift position "−" are arranged in the longitudinal direction of the vehicle. When the shift lever 49 is operated to the upshift position "+" or the downshift position "−", the selected range is switched to one of the "D" range to the "L" range. For example, the five shift ranges at the "M" position, that is, the "D" range to the "L" range are a plural kinds of shift ranges that are different from each other in the total speed change ratio $\gamma T$ at the high-speed side (the minimum speed change ratio side) in the range of change of the total speed change ratio $\gamma T$ in which range the automatic ratio shift control of the transmission mechanism 10 is possible. The ranges of the shifting of speed change steps (gear steps) in the five shift ranges are arranged or restricted so as to be different in the maximum speed-side speed change step that can be achieved by the ratio shift of the automatic ratio shift portion 20. Besides, the shift lever 49 is constructed so as to be automatically returned from the upshift position "+" or the downshift position "−" to the "M" position by an urging device such as a spring or the like. Besides, the shift operation device 48 is equipped with a shift position sensor (not shown) for detecting each shift position of the shift lever 49. The shift position sensor outputs to the electronic control unit 40 the shift position of the shift lever 49, the number of times that the shift lever 49 has been operated to the "M" position, etc.

When the "M" position has been selected by operating the shift lever 49, the automatic ratio shift control is performed in the range of the total speed change ratio $\gamma T$ in which the ratio shift of the transmission mechanism 10 is allowed according to a selected one of the five shift ranges, that is, the automatic ratio shift control is performed so that the maximum speed-side speed change step or speed change ratio of a selected one of the shift ranges is not exceeded. For example, during the stepped-ratio transmission travel with the transmission mechanism 10 having been switched to the stepped-ratio transmission state, the automatic ratio shift control of the transmission mechanism 10 is performed in the range of the total speed change ratio $\gamma T$ in which the ratio shift of the transmission mechanism 10 is allowed according to a selected one of the shift ranges. During the continuously variable-ratio transmission travel with the transmission mechanism 10 having been switched to the continuously variable-ratio transmission state, the automatic ratio shift control of the transmission mechanism 10 is performed in the range of the total speed change ratio $\gamma T$ in which the ratio shift of the transmission mechanism 10 is allowed according to a selected one of the shift ranges and which is achieved by the stepless shift width of speed change ratio of the power distribution mechanism 16 and the gear steps established by the automatic ratio shift control in the range of speed change steps in which the shifting of the automatic ratio shift portion 20 is allowed according to the selected one of the shift range. The "M" position is also a shift position for selecting the manual shift travel mode (manual mode) that is a control mode in which the manual ratio shift control of the transmission mechanism 10 is executed.

Figure 6:
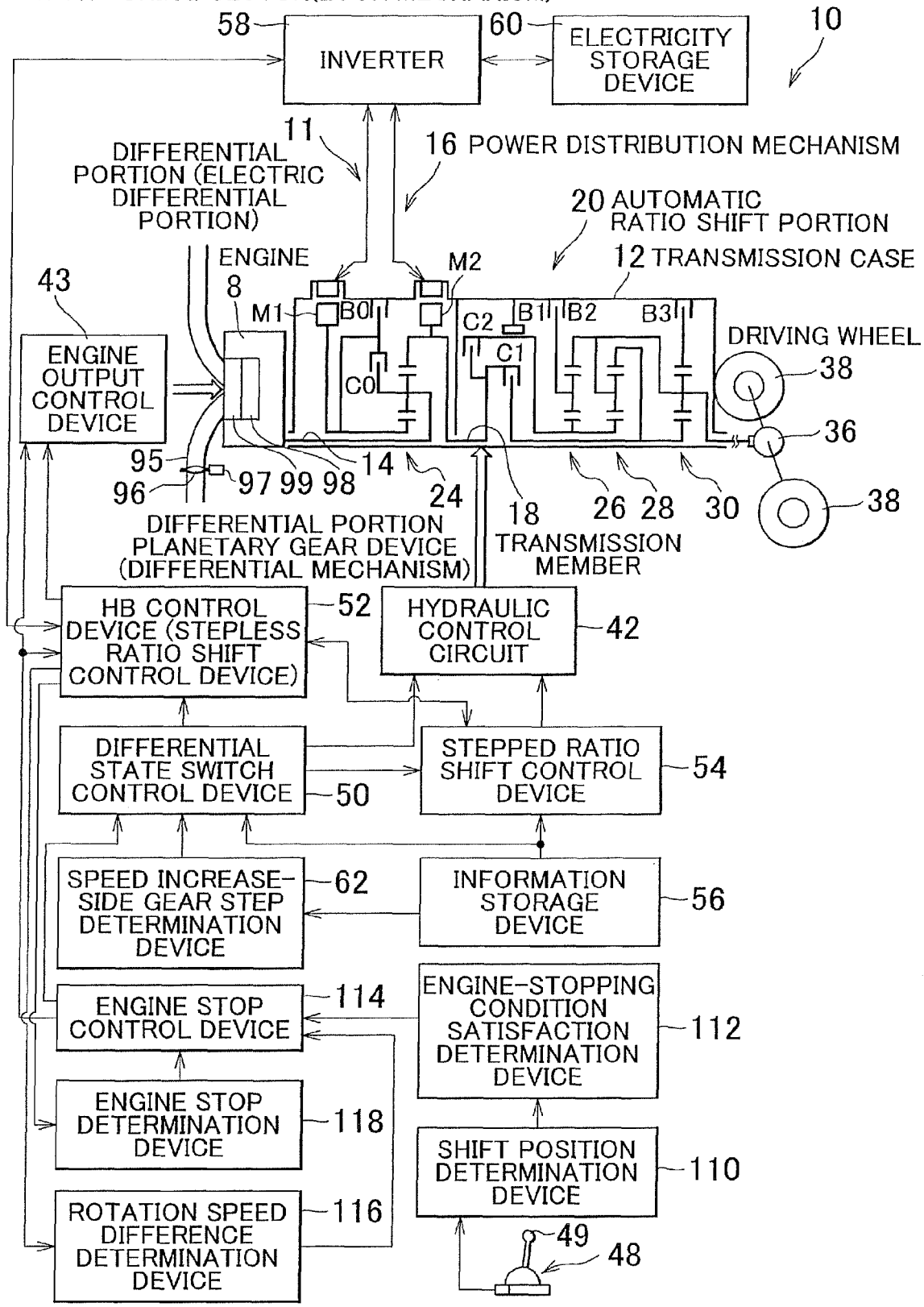
FIG. 6 is a functional block diagram illustrating portions of control operations of the electronic control unit in FIG. 4.

FIG. 6 is a functional block diagram illustrating portions of the control functions performed by the electronic control unit 40. Referring to FIG. 6, a stepped-ratio shift control device 54 functions as a ratio shift control device that shifts the transmission ratio of the automatic ratio shift portion 20. For example, the stepped-ratio shift control device 54 determines whether or not to execute a ratio shift of the automatic ratio shift portion 20, that is, determines the speed change step to which the automatic ratio shift portion 20 is to be shifted, on the basis of the state of the vehicle shown by the vehicle speed V and the requested output torque $T_{OUT}$ of the automatic ratio shift portion 20 from relations (a shift chart, a shift map) pre-stored in an information storage device 56 which are shown by solid lines and dashed one-dotted lines in FIG. 7. Then, the stepped ratio shift control device 54 executes a ratio shift of the automatic ratio shift portion 20 so that the determined speed change step will be obtained. At this time, the stepped-ratio shift control device 54 outputs to a hydraulic control circuit 42 a command (ratio shift output command) to engage and/or release the hydraulic type friction engagement devices excluding the switching clutch C0 and the switching brake B0, in such a manner that the speed change step is achieved, for example, in accordance with the engagement table shown in FIG. 2.

A hybrid control device 52 operates the engine 8 in a high-efficiency operation region during the continuously variable-ratio transmission state of the transmission mechanism 10, that is, during the differential state of the differential portion 11, and also controls the speed change ratio γ0 of the differential portion 11 as an electric continuously variable transmission by changing the distribution of drive force between the engine 8 and the second electric motor M2 and the reaction force caused by the electricity generation of the first electric motor M1 in an optimum fashion. For example, given a present traveling vehicle speed, a target (requested) output of the vehicle is calculated from the vehicle speed V and the accelerator pedal operation amount Acc as a driver's requested output amount. From the target output of the vehicle and the requested value of electricity charge, a necessary total target output is calculated. Then, taking into account the transmission loss, the accessory load, the assist torque of the second electric motor M2, etc., a target engine output is calculated so that the foregoing total target output will be obtained. Then, the engine 8 is controlled so as to produce an engine rotation speed $N_E$ and an engine torque $T_E$ that achieve the target engine output, and the amount of electricity generation of the first electric motor M1 is controlled.

The hybrid control device 52 executes the control, by factoring in the speed change step of the automatic ratio shift portion 20 for the purpose of improving the power performance, the fuel economy, or the like. In this hybrid control, the differential portion 11 is caused to function as an electric continuously variable transmission in order to achieve conformity between the engine rotation speed $N_E$ determined in order to operate the engine 8 in a high-efficiency operation region and the rotation speed of the transmission member 18 determined by the vehicle speed V and the speed change step of the automatic ratio shift portion 20. Specifically, the hybrid control device 52 has a pre-stored optimum specific fuel consumption curve (a fuel economy map, a relation) of the engine 8 which is empirically determined beforehand so that both good operation characteristic and good fuel economy can be achieved during the continuously variable-ratio transmission travel of the vehicle, in a two-dimensional coordinate system using as parameters the engine rotation speed $N_E$ and the output torque (engine torque) $T_E$ of the engine 8. Then, the hybrid control device 52 determines a target value of the total speed change ratio γT of the transmission mechanism 10 such that the engine 8 is operated following the optimal specific fuel consumption curve, for example, such that an engine torque $T_E$ and an engine rotation speed $N_E$ for achieving the engine output that is needed in order to achieve the target output (the total target output, the requested drive force) will be obtained. The speed change ratio γ0 of the differential portion 11 is controlled so that the target value will be obtained. In this manner, the total speed change ratio γT is controlled within the range of change in which the ratio can be shifted, for example, within the range of 13 to 0.5.

At this time, the hybrid control device 52 supplies the electric energy generated by the first electric motor M1 to the electricity storage device 60 or the second electric motor M2 through an inverter 58. Therefore, while a major portion of the power of the engine 8 is mechanically transmitted to the transmission member 18, a portion of the power of the engine 8 is consumed for the electricity generation by the first electric motor M1, and is thereby converted into electric energy, which is supplied to the second electric motor M2 through the inverter 58, so that the second electric motor M2 is driven and the motive power output by the second electric motor M2 is transmitted to the transmission member 18. The devices or the like involved in a process from the generation of electric energy to the consumption thereof by the second electric motor M2 form an electric path in which a portion of the power of the engine 8 is converted into electric energy and then the electric energy is converted into mechanical energy.

Furthermore, the hybrid control device 52 functionally has an engine output control device that executes the output control of the engine 8 so as to produce a necessary output of the engine 8 by outputting commands to control the opening and closing of the electronic throttle valve 96 through the use of the throttle actuator 97 for the throttle control, and control the amount of fuel injection and the timing of fuel injection from the fuel injection device 98 for the fuel injection control, and control the ignition timing of the ignition device 99, such as an igniter or the like, for the ignition timing control, either singly or in combination, to the engine output control device 43. For example, the hybrid control device 52 drives the throttle actuator 97 basically on the basis of the accelerator operation amount signal Acc from the pre-stored relation (not shown), and thus executes the throttle control so that the throttle valve opening degree $θ_{TH}$ increases as the accelerator operation amount Acc increases.

Figure 7:
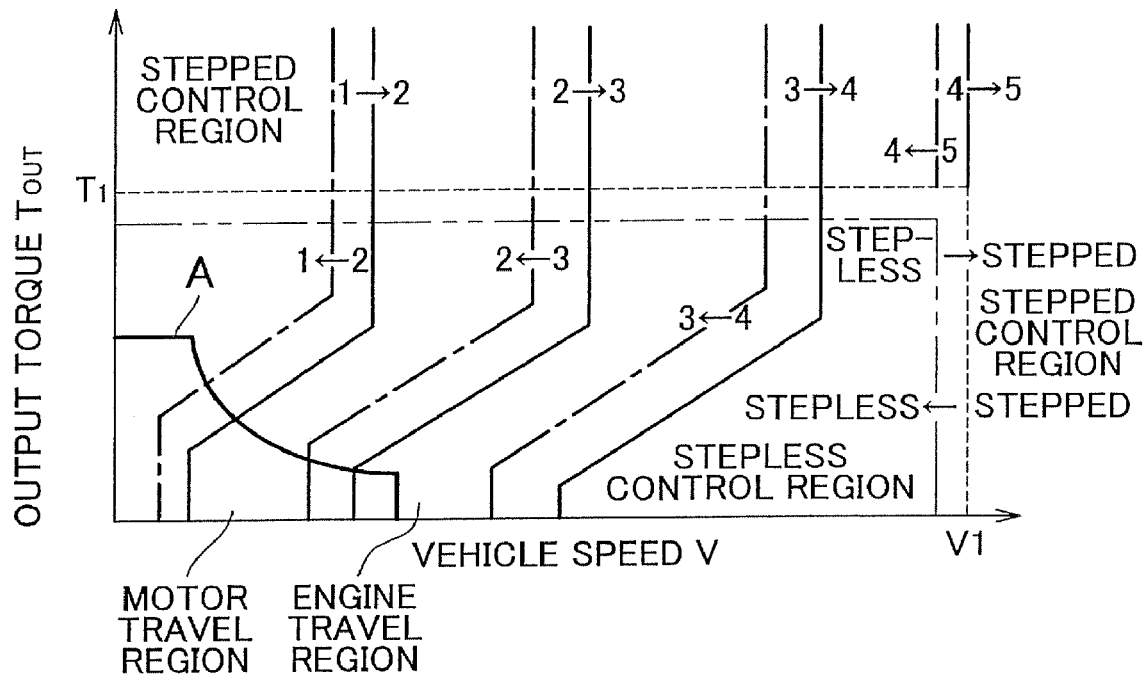
FIG. 7 is a diagram showing an example of a pre-stored shift chart that serves as a basis for the shift determination regarding an automatic ratio shift portion, and a pre-stored switching chart that serves as a basis for the switch determination regarding the state of ratio shift of a transmission mechanism, and an example of a pre-stored drive force source chart that has a border line between an engine travel region and a motor travel region for switching between the engine travel and the motor travel, which are arranged in the same two-dimensional coordinate system, with the parameters being the vehicle speed and the output torque, and show relations among themselves.

In FIG. 7, a solid line A is a border line between the engine travel region and the motor travel region which is determined for switching the drive force source for the start/travel of the vehicle (hereinafter, referred to as "travel-purpose drive force source") between the engine 8 and an electric motor, for example, the second electric motor M2, in other words, for switching between the so-called engine travel in which the engine 8 is used as a travel-purpose drive force source in order to cause the vehicle to start/travel (hereinafter, referred to as "travel") and the so-called motor travel in which the second electric motor M2 is used as a travel-purpose drive force source in order to cause the vehicle to travel. A pre-stored relation having the border line (solid line A) for switching between the engine travel and the motor travel as shown in FIG. 7 is an example of a drive force source switch chart (drive force source map) constructed in a two-dimensional coordinate system using as parameters the vehicle speed V and the output torque $T_{OUT}$ that is a drive force-related value. This drive force source switch chart is pre-stored in the information storage device 56, together with a ratio shift chart (ratio shift map), for example, shown by the solid lines and the dashed one-dotted lines in FIG. 7 as well.

Then, the hybrid control device 52 determines whether the travel region is the motor travel region or the engine travel region on the basis of, for example, the state of the vehicle shown by the vehicle speed V and the requested output torque $T_{OUT}$ in the drive force source switch chart shown in FIG. 7, and accordingly executes the motor travel or the engine travel. Thus, the motor travel caused by the hybrid control device 52, as is apparent from FIG. 7, is executed at the time of relatively low output torque $T_{OUT}$, that is, at the time of low engine torque $T_E$, at which the engine efficiency is generally considered low in comparison with in a high torque region, or at the time of a relatively low vehicle speed at which the vehicle speed V is relatively low, that is, in a low load region.

During the motor travel, in order to improve the fuel economy by restraining the drag of the engine 8 being at rest, the hybrid control device 52 keeps the engine rotation speed $N_E$ at zero or substantially zero due to the electric CVT function (differential motion effect) of the differential portion 11, by controlling the first electric motor rotation speed $N_{M1}$ at a negative value of the rotation speed, for example, causing the first electric motor M1 to freewheel.

Furthermore, even during the engine travel region, the hybrid control device 52 is able to perform a torque assist for supplementing the power of the engine 8 by supplying the second electric motor M2 with the electric energy from the electricity storage device 60 and/or the electric energy from the first electric motor M1 via the aforementioned electric path and therefore driving the second electric motor M2. Hence, the engine travel in this embodiment includes a combination of the engine travel and the motor travel.

Furthermore, the hybrid control device 52 is able to maintain the state of operation of the engine 8 by the electric CVT function of the differential portion 11 even when the vehicle is in a stopped state or a low vehicle speed state. For example, in the case where during a stop of the vehicle the state of charge SOC of the electric storage device 60 drops so that the electricity generation by the first electric motor M1 is needed, the power of the engine 8 is used to cause the first electric motor M1 to generate electricity and lift the rotation speed of the first electric motor M1. Even when the rotation speed $N_{M2}$ of the second electric motor, uniquely determined by the vehicle speed V, becomes zero (substantially zero) due to the stopped state of the vehicle, the engine rotation speed $N_E$ is kept at or above a rotation speed that allows a self-sustaining operation of the engine 8 by the differential motion effect of the power distribution mechanism 16.

Furthermore, the hybrid control device 52 is able to keep the engine rotation speed $N_E$ at an arbitrary rotation speed by controlling the rotation speed $N_{M1}$ of the first electric motor M1 and/or the rotation speed $N_{M2}$ of the second electric motor M2 by the electric CVT function of the differential portion 11, regardless of whether the vehicle is in the stopped state or is traveling. For example, as can be seen from the alignment chart of FIG. 3, when the engine rotation speed $N_E$ is to be lifted, the hybrid control device 52 lifts the rotation speed $N_{M1}$ of the first electric motor M1 while keeping substantially constant the rotation speed $N_{M2}$ of the second electric motor M2 that is restrained by the vehicle speed V.

A speed increase-side gear step determination device 62 determines whether or not the speed change step to which the transmission mechanism 10 needs to be shifted is a speed increase-side gear step, for example, the fifth-speed gear step, for example, on the basis of the state of the vehicle, in accordance with the ratio shift chart shown in FIG. 7 which is pre-stored in the information storage device 56, in order to determine which one of the switching clutch C0 and the switching brake B0 is to be engaged in order to put the transmission mechanism 10 into the stepped-ratio transmission state.

A switch control device 50 selectively switches the state of ratio shift between the continuously variable-ratio transmission state and the stepped-ratio transmission state, that is, between the aforementioned differential state and the aforementioned locked state, by switching the differential state switch devices (the switching clutch C0 and the switching brake B0) between the engaged state and the released state on the basis of the state of the vehicle. For example, the switch control device 50 determines whether or not to switch the state of ratio shift of the transmission mechanism 10 (the differential portion 11) on the basis of the state of the vehicle represented by the vehicle speed V and the requested output torque $T_{OUT}$ in the relation (the switch chart, the switch map) shown by the broken lines and the dashed two-dotted lines in FIG. 7 which is pre-stored in the information storage device 56, that is, the switch control device 50 determines the state of ratio shift to which the transmission mechanism 10 needs to be switched, by determining whether the state of the vehicle is in a stepless control region in which the transmission mechanism 10 is caused to be in the continuously variable-ratio transmission state or a stepped control region in which the transmission mechanism 10 is caused to be in the stepped-ratio transmission state. Then, the switch control device 50 executes the switching of the state of ratio shift in which the transmission mechanism 10 is selectively switched to one of the continuously variable-ratio transmission state and the stepped-ratio transmission state.

Concretely, when the switch control device 50 has determined that the state of the vehicle is in the stepped-ratio shift control region, the switch control device 50 outputs to the hybrid control device 52 a signal that causes the hybrid control or the stepless ratio shift control to be non-permitted or to be prohibited, and at the same time gives the stepped-ratio shift control device 54 a permission to perform a pre-set shift for the stepped ratio shift. At this time, the stepped-ratio shift control device 54 executes the automatic ratio shift of the automatic ratio shift portion 20 in accordance with the ratio shift chart, for example, shown in FIG. 7, which is pre-stored in the information storage device 56. For example, the engagement table in FIG. 2 that is pre-stored in the information storage device 56 shows combinations of operations of the hydraulic type friction engagement devices, that is, the clutches C0, C1 and C2 and the brakes B0, B1, B2 and B3, an appropriate one of which is selected for the ratio shift. That is, the transmission mechanism 10 as a whole, made up of the differential portion 11 and the automatic ratio shift portion 20, functions as a so-called stepped-ratio automatic transmission, and achieves one of the speed change steps in accordance with the engagement table shown in FIG. 2.

For example, in the case where it is determined by the speed increase-side gear step determination device 62 that the speed change step to which the transmission mechanism 10 needs to be shifted is the fifth-speed gear step, in order to achieve a speed increase-side gear step whose speed change ratio is less than 1.0, that is, a so-called overdrive gear step, in the transmission mechanism 10 as a whole, the switch control device 50 outputs to the hydraulic control circuit 42 a command to release the switching clutch C0 and engage the switching brake B0 so that the differential portion 11 is caused to function as a subsidiary transmission whose speed change ratio γ0 is fixed, for example, whose speed change ratio γ0 is 0.7. In the case where it is determined by the speed increase-side gear step determination device 62 that the speed change step to which the transmission mechanism 10 needs to be shifted is not the fifth-speed gear step, in order to achieve a speed reduction-side gear step whose speed change ratio is higher than or equal to 1.0 in the transmission mechanism 10 as a whole, the switch control device 50 outputs to the hydraulic control circuit 42 a command to engage the switching clutch C0 and release the switching brake B0 so that the differential portion 11 is caused to function as a subsidiary transmission whose speed change ratio γ0 is fixed, for example, whose speed change ratio γ0 is 1. Thus, the transmission mechanism 10 is switched to the stepped-ratio transmission state by the switch control device 50, and is selectively switched so as to set one of two kinds of speed change steps available in the stepped-ratio transmission state, and the differential portion 11 is caused to function as a subsidiary transmission, and the automatic ratio shift portion 20 connected in series to the differential portion 11 functions as a stepped-ratio transmission. In this manner, the transmission mechanism 10 as a whole is caused to function as a so-called stepped-ratio automatic transmission.

However, in the case where the switch control device 50 determines that the state of the vehicle is in the stepless ratio shift control region in which the transmission mechanism 10 is to be switched to the continuously variable-ratio transmission state, in order to achieve a continuously variable-ratio transmission state in the transmission mechanism 10 as a whole, the switch control device 50 outputs to the hydraulic control circuit 42 a command to release both the switching clutch C0 and the switching brake B0 so that the differential portion 11 is caused to be in the continuously variable-ratio transmission state and be capable of continuously variable-ratio transmission. Simultaneously, the switch control device 50 outputs to the hybrid control device 52 a signal that permits the hybrid control, and outputs to the stepped-ratio shift control device 54 a signal that fixes the speed change step to a pre-set speed change step for the stepless ratio shift, or outputs thereto a signal that permits the automatic ratio shift of the automatic ratio shift portion 20 in accordance with a ratio shift chart, for example, as shown in FIG. 7, which is pre-stored in the information storage device 56. In this case, the automatic ratio shift is performed by the stepped-ratio shift control device 54 operating the clutches and brakes shown in the engagement table of FIG. 2 excluding the switching clutch C0 and the switching brake B0. Thus, the differential portion 11 switched to the continuously variable-ratio transmission state by the switch control device 50 functions as a continuously variable transmission, and the automatic ratio shift portion 20 connected in series therewith functions as a stepped-ratio transmission. Therefore, a drive force of an appropriate magnitude can be achieved, and at the same time, the rotation speed input to the automatic ratio shift portion 20 respectively for the gear steps of the automatic ratio shift portion 20, that is, the first speed, the second speed, the third speed and the fourth speed, and the rotation speed of the transmission member 18 is steplessly changed, so that each of the gear steps is provided with a stepless shift width of speed change ratio. Therefore, the speed change ratio can be steplessly and continuously changed between the gear steps. That is, the transmission mechanism 10 as a whole is in the continuously variable-ratio transmission state, and the total speed change ratio γT can be continuously variably obtained.

Herein, FIG. 7 will be described in detail. The diagram of FIG. 7 shows a relation (a ratio shift chart, a ratio shift map) that serves as a basis for the ratio shift determination regarding the automatic ratio shift portion 20 and that is pre-stored in the information storage device 56, and is an example of the ratio shift chart constructed in a two-dimensional coordinate system using as parameters the vehicle speed V and the requested output torque $T_{OUT}$ that is a drive force-related value. In FIG. 7, the solid lines are upshift lines, and the dashed one-dotted lines are downshift lines.

Furthermore, the broken line in FIG. 7 shows a criterion vehicle speed V1 and a criterion output torque T1 for the determination performed by the switch control device 50 as to whether the state of the vehicle is in the stepped control region or the stepless control region. That is, the broken line in FIG. 7 shows a high-vehicle speed criterion line representing a criterion vehicle speed V1 that is a pre-set high-speed travel criterion value for determining a high-speed travel of the hybrid vehicle, and a high-output travel criterion line representing a criterion output torque T1 that is a pre-set high-output travel criterion value for determining a high-output travel in which a drive force-related value that is related to the drive force of the hybrid vehicle, for example, the output torque $T_{OUT}$ of the automatic ratio shift portion 20, is high. Furthermore, as shown by the dashed two-dotted line corresponding to the broken line in FIG. 7, a hysteresis is provided for the determination as to whether the state of the vehicle is in the stepped control region or the stepless control region. That is, FIG. 7 is a pre-stored switch chart (a switch map, a relation) for the region determination performed by the switch control device 50 as to whether the state of the vehicle is in either stepped control region or the stepless control region, with the parameters being the vehicle speed V and the output torque $T_{OUT}$, including the criterion vehicle speed V1 and the criterion output torque T1. Incidentally, this switch chart may also be pre-stored as a ratio shift map in the information storage device 56. Besides, this switch chart may be a chart that includes at least one of the criterion vehicle speed V1 and the criterion output torque T1, or may also be a pre-stored switch chart that uses one of the vehicle speed V and the output torque $T_{OUT}$ as a parameter.

The shift chart, the switch chart, the drive force source switch chart, etc., may also be stored not as a map but as a determinant expression for comparing the actual vehicle speed V and the criterion vehicle speed V1, a determinant expression for comparing the output torque $T_{OUT}$ and the criterion output torque T1, etc. In such a case, the switch control device 50 causes the transmission mechanism 10 to be in the stepped-ratio transmission state when, for example, the actual vehicle speed as a state of the vehicle exceeds the criterion vehicle speed V1. Besides, the switch control device 50 causes the transmission mechanism 10 to be in the stepped-ratio transmission state when, for example, the output torque $T_{OUT}$ of the automatic ratio shift portion 20 as a state of the vehicle exceeds the criterion output torque T1.

Besides, at the time of a failure or a functional decline of an electric-system control appliance, such as an electric motor or the like, provided for operating the differential portion 11 as an electrical continuously variable transmission, for example, at the time of a state of the vehicle with the occurrence of a functional decline of an appliance related to the electric path from the generation of electric energy by the first electric motor M1 to the conversion of the electric energy into mechanical energy, that is, a failure of the first electric motor M1, the second electric motor M2, the inverter 58, the electric storage device 60, an electric transmission line, etc., or a functional decline thereof due to a failure or low temperature or the like, it is permissible that the switch control device 50 may cause the transmission mechanism 10 to be in the stepped-ratio transmission state with priority in order to secure the travel of the vehicle even when the state of the vehicle is in the stepless control region.

The drive force-related value is a parameter corresponding one-to-one to the drive force of the vehicle, and may be not only the drive torque or the drive force of the driving wheels 38, but may also be actual values of, for example, the output torque $T_{OUT}$ of the automatic ratio shift portion 20, the engine torque $T_E$, the vehicle acceleration, the engine torque $T_E$ calculated on the basis of, for example, the engine rotation speed $N_E$ and the accelerator operation amount or the throttle valve degree of opening $\theta_{TH}$ (or the intake air amount, or the air-fuel ratio, or the amount of fuel injection), etc., or estimated values of the requested (target) engine torque $T_E$ calculated on the basis of the driver's accelerator pedal operation amount or the degree of throttle opening or the like, the requested (target) output torque $T_{OUT}$ of the automatic ratio shift portion 20, the requested drive force, etc. Besides, the aforementioned drive torque may be calculated from the output torque $T_{OUT}$ or the like, by taking into account the differential ratio, the radius of the driving wheels 38, etc., or may also be directly detected by, for example, a torque sensor or the like. The same thing can be said with regard to other kinds of torques or the like mentioned above.

Besides, as for the criterion vehicle speed V1, for example, in order to restrain the deterioration of the fuel economy that is caused if the transmission mechanism 10 is put into the continuously variable-ratio transmission state during a high-speed travel, the criterion vehicle speed V1 is set so that during that high-speed travel, the transmission mechanism 10 is caused to be in the stepped-ratio transmission state. Besides, as for the criterion torque T1, as the size of the first electric motor M1 is reduced with the omission of the adaptation of the reaction torque of the first electric motor M1 to the high output region of the engine during the high-output travel of the vehicle, the criterion torque T1 is set according to the characteristic of the first electric motor M1 that, for example, is provided with a reduced maximum electric energy output.

Figure 8:
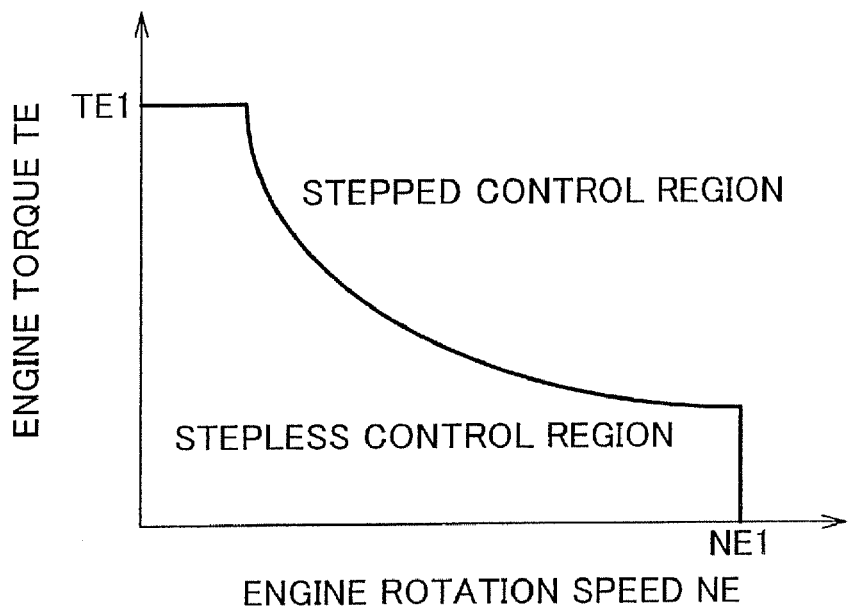
FIG. 8 is a diagram having a border line between a stepless control region and a stepped control region and showing a pre-stored relation, and is also a conceptual diagram for arranging in the form of a map the border between the stepless control region and the stepped control region shown by a broken line FIG. 7.

FIG. 8 is a switch chart (a switch map, or a relation) that is pre-stored in the information storage device 56 and that uses the engine rotation speed $N_E$ and the engine torque $T_E$ as parameters and has an engine output line as a border line for determining whether the present region is the stepped control region or the stepless control region through the use of the switch control device 50. Instead of using the switch chart of FIG. 7, the switch control device 50 may use the switch chart of FIG. 8 to determine whether the state of the vehicle represented by the engine rotation speed $N_E$ and the engine torque $T_E$ is in the stepless control region or in the stepped control region, on the basis of the engine rotation speed $N_E$ and the engine torque $T_E$. FIG. 8 is a conceptual diagram for forming the broken line shown in FIG. 7. In other words, the broken line in FIG. 7 is also a switch line that is re-arranged in a two-dimensional coordinate system using the vehicle speed V and the output torque $T_{OUT}$ as parameters on the basis of a relational diagram (map) of FIG. 8.

As shown by a relation expressed in FIG. 7, a high torque region in which the output torque $T_{OUT}$ is higher than or equal to a pre-set criterion output torque T1 or a high vehicle speed region in which the vehicle speed V is higher than or equal to a pre-set criterion vehicle speed V1 is set as the stepped control region. Therefore, the stepped-ratio transmission travel is executed at the time of high drive torque when the torque of the engine 8 is relatively high, or at the time of relatively high vehicle speed when the vehicle speed is relatively high. The continuously variable-ratio transmission travel is executed at the time of low drive torque when the torque of the engine 8 is relatively low, or at the time of relatively low vehicle speed when the vehicle speed is relatively low, that is, in a normal or ordinary output region of the engine 8.

Likewise, as shown by a relation expressed in FIG. 8, a high torque region in which the engine torque $T_E$ is greater than or equal to a pre-set predetermined value TE1, or a high rotation speed region in which the engine rotation speed $N_E$ is higher than or equal to a pre-set predetermined value NE1, or a high output region in which the engine output calculated from the engine torque $T_E$ and the engine rotation speed $N_E$ is higher than or equal to a predetermined value is set as the stepped control region. Therefore, the stepped-ratio transmission travel is executed at the time of relatively high torque of the engine 8, or at the time of relatively high rotation speed thereof, or at the time of relatively high output thereof. The continuously variable-ratio transmission travel is executed at the time of relatively low torque of the engine 8, or at the time of relatively low rotation speed thereof, or at the time of relatively low output thereof, that is, in the normal or ordinary output region of the engine 8. In FIG. 8, the border line between the stepped control region and the stepless control region corresponds to a high-vehicle speed criterion line that is a series of high-vehicle speed criterion values and a high-output travel criterion line that is a series of high-output travel criterion values.

Therefore, for example, during a low-to-intermediate speed travel and a low-to-intermediate output travel, the transmission mechanism 10 is caused to be in the continuously variable-ratio transmission state, so that good fuel economy performance of the vehicle is secured. During a high-speed travel in which the actual vehicle speed V exceeds the aforementioned criterion vehicle speed V1, the transmission mechanism 10 is caused to be in the stepped-ratio transmission state in which the transmission mechanism 10 operates as a stepped-ratio transmission, so that the output of the engine 8 is transmitted to the driving wheels 38 entirely via a mechanical power transmission path, thus restraining the loss in the conversion between the power and electric energy that occurs when the transmission mechanism 10 is operated as an electrical continuously variable transmission. Therefore, fuel economy improves. Besides, during a high-output travel in which the output torque $T_{OUT}$ or the like, as an example of the drive force-related value, exceeds the criterion torque T1, the transmission mechanism 10 is caused to be in the stepped-ratio transmission state in which the transmission mechanism 10 operates as a stepped-ratio transmission, so that the output of the engine 8 is transmitted to the driving wheels 38 entirely via a mechanical power transmission path. The region in which the transmission mechanism 10 is caused to operate as an electrical continuously variable transmission becomes a low-to-intermediate speed travel region and a low-to-intermediate output region of the vehicle, so that the maximum value of the electric energy that the first electric motor M1 needs-to generate, that is, the maximum value of the electric energy that the first electric motor M1 transmits, can be made small. Thus, the first electric motor M1, or the driving device of the vehicle that includes the first electric motor M1 can be further reduced in size. Besides, it can also be considered that during the high-output travel, since the driver's request for drive force is given higher priority than the request for good fuel economy, the state of ratio shift is switched from the continuously variable-ratio transmission state to the stepped-ratio transmission state (fixed-ratio transmission state). Therefore, the user is allowed to enjoy changes in the engine rotation speed $N_E$ involved in upshifts during the stepped-ratio automatic transmission travel, that is, rhythmical changes in the engine rotation speed $N_E$ involved in ratio shifts.

Referring back to FIG. 6, a shift position determination device 110 determines whether or not the shift lever 49 is presently at one of the "N" position and the "P" position that are non-driving positions, or has been operated to the "N" position or the "P" position, on the basis of a signal $P_{SH}$ from a shift position sensor (not shown) that represents the shift position of the shift lever 49. Incidentally, when the shift lever 49 is positioned at the "N" position or the "P" position, the automatic ratio shift portion 20 enters a power transmission disconnected state (neutral state), so that the linkage between the transmission member 18 and the driving wheels 38 is disconnected.

When it is determined by the shift position determination device 110 that the automatic ratio shift portion 20 is in the power transmission disconnected state (neutral state), an engine-stopping condition satisfaction determination device 112 determines whether or not a condition for stopping the operation of the engine 8 by stopping the supply of fuel to the engine 8 has been satisfied. The engine-stopping condition satisfaction determination device 112 determines that the condition for stopping the operation of the engine 8 has been satisfied, for example, when the operation of the engine 8 is stopped after the vehicle is stopped, or when the warm-up is completed, or when the operation of the engine 8 is stopped during deceleration travel during the aforementioned neutral state, or the like.

In the case where it is determined by the engine-stopping condition satisfaction determination device 112 that the condition for stopping the operation of the engine 8 has been satisfied, the engine stop control device 114 outputs to the engine output control device 43 a command to stop the supply of fuel from the fuel injection device 98 to the engine 8, that is, a command to execute a fuel-cut. When the supply of fuel to the engine 8 is stopped to establish an engine stopped state, no engine torque $T_E$ is output, and the first electric motor M1 enters a freewheeling state in which reaction torque cannot be produced, so that the engine rotation speed $N_E$ drops to an engine rotation stopped state, that is, the engine rotation speed $N_E$ drops to zero.

As the supply of fuel to the engine 8 is stopped, the engine rotation speed $N_E$ declines. During the decline in the engine rotation speed, resonance of the vehicle power transmission system occurs in an engine rotation speed region (e.g., 100 to 200 rpm). It is desirable that the engine rotation speed promptly pass through the engine rotation speed region. Therefore, the engine stop control device 114 controls the engine rotation speed $N_E$ via the first electric motor M1, in order to cause the engine rotation speed to pass through the engine rotation speed region in which the resonance occurs.

Concretely, the engine stop control device 114 controls the engine rotation speed by using the first electric motor M1 so that the engine rotation speed $N_E$ promptly passes through the rotation speed region in which the resonance of the power transmission system occurs. That is, the engine stop control device 114 outputs to the hybrid control device 52 a command to force the engine rotation speed $N_E$ to decline by using the first electric motor M1. Following the command, the hybrid control device 52 applies to the first electric motor M1 a drive torque in such a direction as to reduce the engine rotation speed $N_E$, that is, reduces the engine rotation speed $N_E$ by lowering the rotation speed $N_{M1}$ of the first electric motor M1. For example, the rate at which the rotation speed $N_{M1}$ of the first electric motor M1 is lowered by the hybrid control device 52 is set beforehand through experiments or the like at such a rate that the engine rotation speed $N_E$ more promptly declines and therefore the occurrence of vibration of the vehicle greater than or equal to a predetermined value is restrained, in comparison with the case where the engine rotation speed $N_E$ naturally declines during the engine operation stopped state.

Then, when it is determined by the shift position determination device 110 that the shift lever 49 has been positioned at the "N" position or the "P" position, the automatic ratio shift portion 20 enters the power transmission disconnected state, that is, a state in which the linkage between the driving wheels 38 and the differential portion ring gear R0 that functions as the output shaft of the differential portion 11 is disconnected. Therefore, the inertia of the differential portion ring gear R0 becomes smaller than the inertia of the differential portion carrier CA0 connected to the engine 8. If in this state, the rotation speed $N_{M1}$ of the first electric motor M1 is lowered to reduce the engine rotation speed $N_E$, the rate of rise in the rotation speed of the differential portion ring gear R0 becomes greater than the rate of rise in the rotation speed of the differential portion carrier CA0, and therefore there is a possibility that the differential motion effect of the differential portion 11 (the power distribution mechanism 16) may lift the rotation speed of the differential portion ring gear R0, bringing about a high rotation speed state. That is, since the inertia of the differential portion ring gear R0 is smaller than the inertia of the differential portion carrier CA0, there is a possibility of the rotation speed being lifted since the differential portion ring gear R0 is affected by the drive torque of the first electric motor M1.

Therefore, when the automatic ratio shift portion 20 executes the engine stop control during the power transmission disconnected state, the engine stop control device 114 executes a control of not lifting the rotation speed of the differential portion ring gear R0 of the automatic transmission portion 20. Hereinafter, a concrete control method will be described.

When it is determined by the shift position determination device 110 that the automatic ratio shift portion 20 is in the neutral state and it is determined by the engine-stopping condition satisfaction determination device 112 that the condition for stopping the operation of the engine 8 has been satisfied, the engine stop control device 114 executes a so-called fuel-cut of stopping the supply of fuel to the engine 8, and also outputs to the differential state switch control device 50 a command to engage (operate) the switching clutch C0 or to put the switching clutch C0 into slipping engagement. When the switching clutch C0 engaged (or slip-engaged), the differential portion sun gear S0 and the differential portion carrier CA0 assume a locked-up state (or a slipping state), so that the differential portion planetary gear device 24 is rotated integrally as one unit (or rotated substantially integrally with a slip). Incidentally, the switching clutch C0 in this embodiment may be regarded as a lock mechanism in the aspects of the invention.

When the switching clutch C0 is engaged or slip-engaged, the rotating elements of the differential portion planetary gear device 24 (the differential portion 11) that functions as a differential mechanism are turned integrally as one unit or rotated substantially integrally with slipping. In other words, when the switching clutch C0 is engaged or slip-engaged, the differential motion of the differential portion planetary gear device 24 is restricted, and the rotating elements of the differential portion planetary gear device 24 (the differential portion sun gear S0, the differential portion carrier CA0, and the differential portion ring gear R0) are rotated at the same rotation speed (or substantially the same rotation speed).

Besides, in this state, the engine stop control device 114 applies to the first electric motor M1 a drive torque in such a direction as to reduce the engine rotation speed $N_E$. As the rotation speed $N_{M1}$ of the first electric motor M1 is thus lowered, the rotation speed of the differential portion sun gear S0 of the differential portion planetary gear device 24 that is linked to the first electric motor M1 so as to be capable of power transmission is lowered, and at the same time, the rotation speed of the differential portion carrier CA0 and the differential portion ring gear R0 having been caused to integrally rotate together (or substantially integrally rotate together) is lowered in substantially the same manner. That is, by controlling the state of operation of the first electric motor M1, the rotation speed $N_E$ of the engine 8 linked to the differential portion carrier CA0 can be promptly reduced. Furthermore, since the differential motion of the differential portion planetary gear device 24 is restricted, the rise of the rotation speed of the differential portion ring gear R0 is inhibited.

Besides, the engine stop control device 114 can also stop the engine 8 without the differential portion ring gear R0 being rotated at high speed, through the operation of the switching brake B0, specifically, by causing the differential portion sun gear S0 linked to the first electric motor M1 to be in a fixed (rotation stopped) or slipping state, instead of through the operation of the switching clutch C0. When the switching brake B0 is operated, the differential portion sun gear S0 is fixed, so that the rotation speed of the differential portion ring gear R0 is determined on the basis of the engine rotation speed $N_E$ and the gear ratio $\rho 0$ of the differential portion planetary gear device 24. At this time, the rotation speed of the differential portion ring gear R0 is not heightened, but the rotation speed of the differential portion ring gear R0 is reduced as the engine rotation speed $N_E$ reduces. The reduction of the engine rotation speed $N_E$ at this time is a rotation speed reduction of the engine 8 itself caused by the fuel-cut or the like since the rotation speed reduction of the differential portion sun gear S0 by the first electric motor M1 is impossible. Although the description below will be made mainly on the operation of the switching clutch C0, the operation thereof may be replaced with the operation of the switching brake B0. Therefore, the switching brake B0 may also be regarded as the lock mechanism in the aspects of the invention.

A rotation speed difference determination device 116 calculates a difference between the engine rotation speed $N_E$ and the rotation speed $N_{M2}$ of the second electric motor M2, that is, the rotation speed of the differential portion ring gear R0, and then determines whether or not the rotation speed difference is within a predetermined range. If the rotation speed difference between the engine rotation speed $N_E$, that is, the rotation speed of the differential portion carrier CA0, and the rotation speed of the differential portion ring gear R0 is large, the load that acts on the switching clutch C0 at the time of engagement thereof becomes large, and therefore there is possibility of decline of durability. Therefore, the rotation speed difference is calculated by the rotation speed difference determination device 116, and if the rotation speed difference exceeds the predetermined range, a command to restrict the engagement of the switching clutch C0 is output to the differential state switch control device 50. Incidentally, the predetermined range of the rotation speed difference is found beforehand through experiments or the like, and is set to such a rotation speed difference range that the durability of the switching clutch C0 does not decline. In other words, when it is determined by the rotation speed difference determination device 116 that the rotation speed difference between the engine rotation speed $N_E$ and the differential portion ring gear R0 is within the predetermined range, the rotation speed difference determination device 116 outputs to the engine stop control device 114 a command to allow the engine stop control device 114 to operate the switching clutch C0.

Furthermore, the rotation speed difference determination device 116 is able to determine whether or not the rotation speed $N_{M2}$ of the second electric motor M2, that is, the rotation speed of the differential portion ring gear R0, is higher than or equal to a predetermined value, and is able to output to the engine stop control device 114 a command to allow the device 114 to operate the switching clutch C0 if the rotation speed of the differential portion ring gear R0 is higher than or equal to the predetermined value. Incidentally, the predetermined value is set beforehand through experiments or the like, and is set at a relatively low rotation speed. For example, if the rotation speed of the differential portion ring gear R0 is less than the predetermined value, the rise of the rotation speed of the differential portion ring gear R0 is restrained up to a predetermined rotation speed, and therefore the high rotation speed thereof is avoided, without a need to operate the switching clutch C0. In this case, not operating the switching clutch C0 reduces the burden of the control performed by the engine stop control device 114.

An engine stop determination device 118 determines whether or not the engine 8 has completely stopped. Concretely, for example, the engine stop determination device 118 detects the engine rotation speed $N_E$, and determines whether or not the rotation speed $N_E$ is zero. When it is determined by the engine stop control device 118 that the engine 8 has stopped, the engine stop control device 114 outputs to the differential state switch control device 50 a command to release the switching clutch C0, for example, in order to be ready for the next motor start-up performed by the second electric motor M2.

Figure 9:
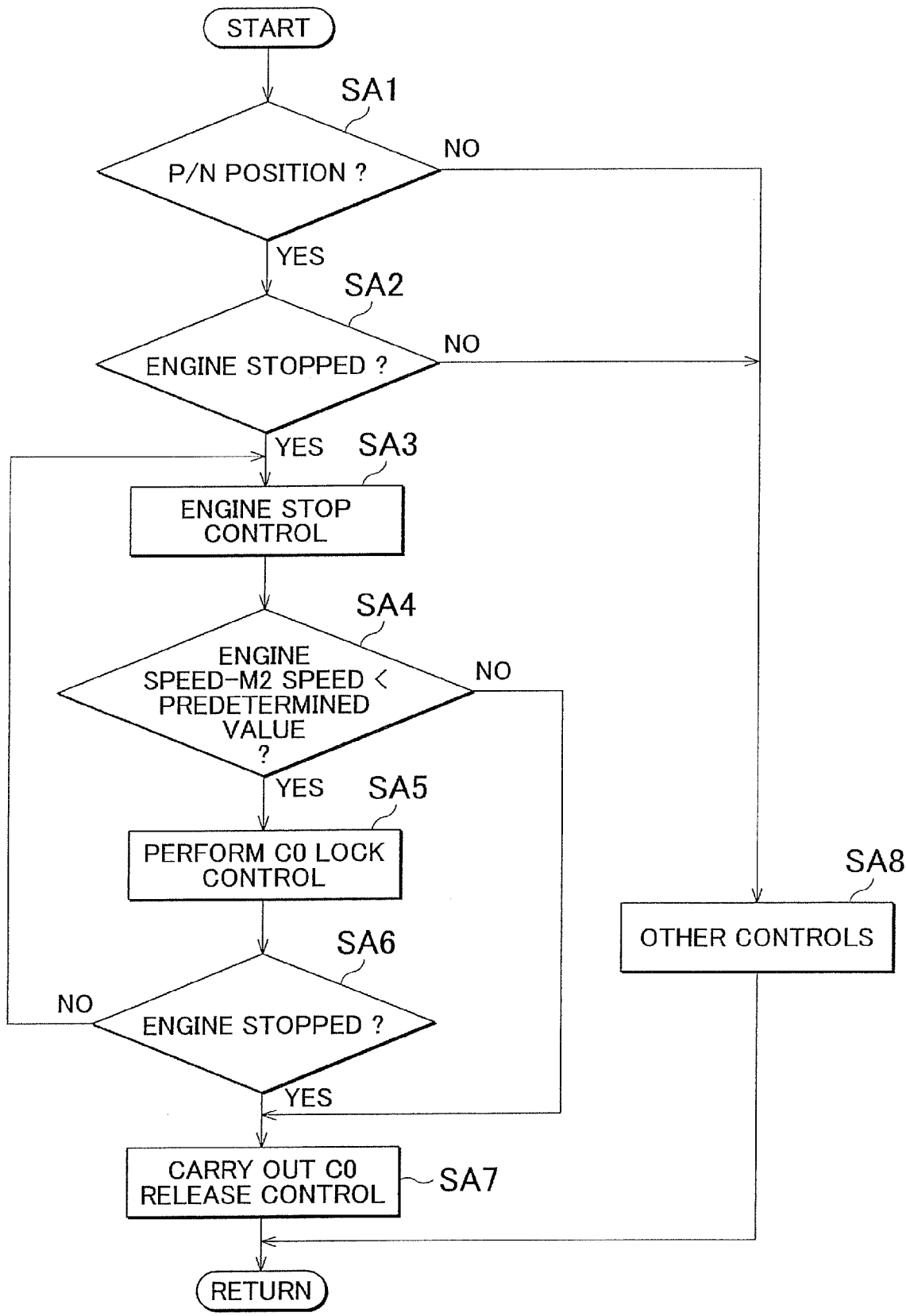
FIG. 9 is a flowchart illustrating portions of control operations of an electronic control unit, that is, a control operation in which even when the automatic ratio shift portion is in a neutral state, the engine is promptly stopped so as to restrain the occurrence of vibrations of the vehicle, and to prevent the increase in the rotation speed of the ring gear of the differential portion.
Figure 10:
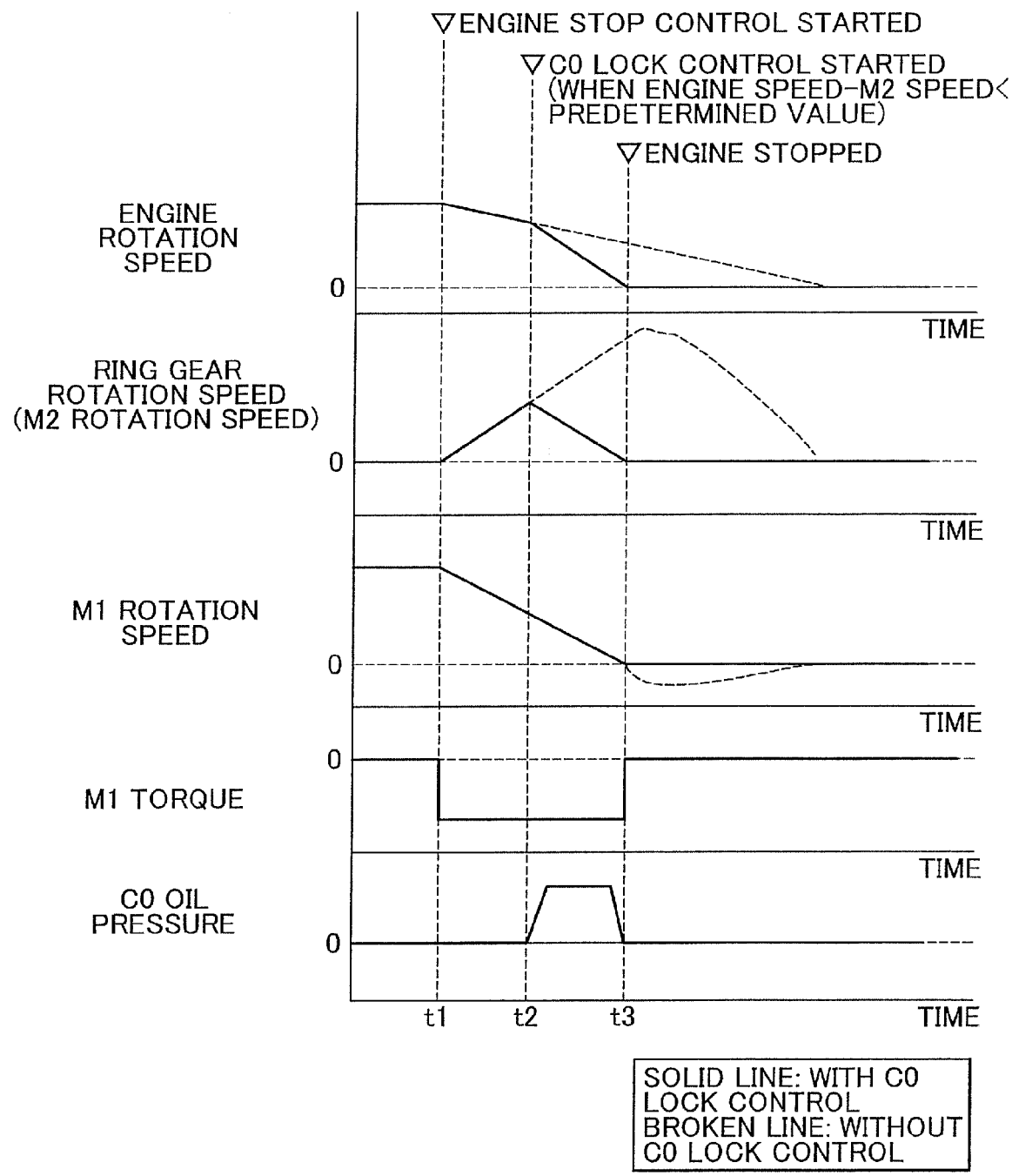
FIG. 10 is also a time chart illustrating an example of the control operation shown by the flowchart of FIG. 9, that is, a control operation of restraining the increase in the rotation speed of the ring gear of the differential portion when the engine is stopped while the automatic ratio shift portion is in the neutral state.

FIG. 9 is a flowchart illustrating a control operation in which the occurrence of vibration of the vehicle is restrained by promptly stopping the engine 8 even if a control operation portion of the electronic control unit 40, that is, the automatic ratio shift portion 20, is the neutral state (power transmission disconnected state), and also in which the high rotation speed of the differential portion ring gear R0 can be prevented. Besides, FIG. 10 is a time chart illustrating an example of a control operation shown by the flowchart in FIG. 9, for example, a control operation in which the high rotation speed of the differential portion ring gear R0 is restrained when the engine 8 has been stopped during the power transmission disconnected state of the automatic ratio shift portion 20.

First, referring to FIG. 9, in SA1 (step SA1) corresponding to the shift position determination device 110, it is determined whether or not the shift lever 49 is positioned at one of the "N" position and the "P" position that are non-driving positions, or whether or not the shift lever 49 has been operated to one of the "N" position and the "P" position. If a negative determination is made in SA1, an other control, such as a ratio shift control or the like, is executed in SA8, followed by the end of this routine.

Conversely, if an affirmative determination is made in SA1, the process proceeds to SA2, which corresponds to the engine-stopping condition satisfaction determination device 112. In SA2, it is determined whether or not the condition for stopping the operation of the engine 8 by stopping the supply of fuel to the engine 8 has been satisfied. If a negative determination is made in SA2, an other control is executed in SA8. On the other hand, if an affirmative determination is made in SA2, the engine stop control is started in SA2, which corresponds to the engine stop control device 114. At a time point t1 in FIG. 10, it is shown that the engine 8 operation-stopping condition is satisfied, and that the fuel-cut by the engine stop control device 114 is started, and that the command to apply to the first electric motor M1 a torque in such a direction as to reduce the engine rotation speed $N_E$ (a negative torque) is output to the engine output control device 43 and the hybrid control device 52. Along with this, the engine rotation speed $N_E$ is reduced. Since the automatic ratio shift portion 20 is disconnected in power transmission, the inertia of the differential portion ring gear R0 is small, so that the negative torque of the first electric motor M1 raises the rotation speed of the differential portion ring gear R0. Incidentally, since the period of the time point t1 to the time point t2 is actually a very short time, the actual rise of the rotation speed of the differential portion ring gear R0 is very small.

In SA4, corresponding to the rotation speed difference determination device 116, a rotation speed difference between the rotation speed $N_E$ of the engine 8 (the differential portion carrier CA0) and the rotation speed $N_{M2}$ of the second electric motor M2 (the differential portion ring gear R0) is calculated, and it is determined whether or not the rotation speed difference is within a predetermined value range. Incidentally, it is permissible to add a process in which it is determined whether or not the rotation speed of the differential portion ring gear R0 is higher than or equal to a predetermined value, and if the rotation speed thereof is higher than or equal to the predetermined value, an affirmative determination is made in SA4. If a negative determination is made in SA4, that is, if the rotation speed difference exceeds the predetermined value range, the engagement of the switching clutch C0 is restricted in order to protect the switching clutch C0. On the other hand, if an affirmative determination is made in SA4, the process proceeds to SA5, which corresponds to the engine stop control device 114. In SA5, the engagement (slip engagement) of the switching clutch C0 is started by outputting a command to cause the differential state switch control device 50 to engage or slip-engage the switching clutch C0. At the time point t2, a state in which the switching clutch C0 has been started is shown. At the time point t2, as the C0 engagement pressure for engaging the switching clutch C0 as shown by a solid line, the switching clutch C0 begins to be engaged is increased, so that the engine rotation speed $N_E$, the rotation speed $N_{M1}$ of the first electric motor M1, and the rotation speed of the differential portion ring gear R0 (the rotation speed $N_{M2}$ of the second electric motor M2) become equal (or substantially equal), and the rotation speeds of these rotating elements are lowered due to the lowering of the rotation speed of the first electric motor M1. In the case where the switching clutch C0 is not engaged, negative torque is applied to the first electric motor M1 to lower the rotation speed $N_{M1}$ of the first electric motor M1. Then, as shown by a broken line, the rotation speed of the differential portion ring gear R0 (the second electric motor M2) further rises due to the differential motion, so as to become a high rotation speed Besides, the engine rotation speed reduction is also delayed as shown by a broken line, and the time of the passage of the engine rotation speed through the region of engine rotation speed in which resonance of the power transmission system occurs becomes long, so that the resonance of the power transmission system also becomes great.

Next, in SA6 corresponding to the engine stop determination device 118, it is determined whether or not the engine 8 has completely stopped. If a negative determination is made in SA6, the process returns to SA3. Then, the engine stop control by the engine stop control device 114 is repeatedly executed until the engine 8 completely stops. When an affirmative determination is made in SA6, the process proceeds to SA7 corresponding to the engine stop control device 114. In SA7, the switching clutch C0 is released, with the engine 8 being completely stopped, so as to be ready for, for example, the next motor travel or the like. The time point t3 shows a state in which due to the engine stop control device 114, the rotation speeds of the engine 8, the first electric motor M1, and the second electric motor M2 (the differential portion ring gear R0) have become zero. At this time, the negative torque of the first electric motor M1 is also made zero, and the engagement pressure on the switching clutch C0 is also reduced so that the switching clutch C0 is released.

As described above, according to the foregoing embodiment, when the engine stop control is executed, with the automatic ratio shift portion 20 being in the neutral state, the switching clutch C0 is operated. Therefore, the differential portion carrier CA0 of the differential portion planetary gear device 24 that is linked to the engine 8, and the differential portion ring gear R0 thereof linked to the automatic ratio shift portion 20 are rotated integrally or rotated substantially integrally while the slipping state is maintained. Therefore, along with the engine stop control, the rotation speed of the rotating elements of the differential portion planetary gear device 24 is reduced, with the rotating elements being rotated integrally or substantially integrally. Due to the integral or substantially integral rotation of the rotating elements, the high rotation speed of the differential portion ring gear R0 linked to the automatic ratio shift portion 20 that tends to have a heightened rotation speed particularly during the neutral state can be prevented. Since the high rotation speed is prevented in this manner, the decline of the durability of various components and the like, including the seal component parts and the bearings that support the differential portion planetary gear device 24, can be restrained.

According to the embodiment, the automatic ratio shift portion 20 is provided on the power transmission path, and the engagement devices, including the clutches C, the brakes B, etc., are portions of the automatic ratio shift portion 20. Therefore, when the clutches C and the brakes B enter the non-engaged state, the automatic ratio shift portion 20 enters the neutral state, and thus the power transmission to the driving wheels 38 can be disconnected.

Furthermore, according to this embodiment, at the time of the engine stop control in the neutral state of the automatic ratio shift portion 20, the switching clutch C0 is operated, and a drive torque in such a direction as to reduce the engine rotation speed $N_E$ is applied to the first electric motor M1 that is linked to the differential portion sun gear S0 of the differential portion planetary gear device 24 so as to be capable of power transmission. Therefore, the engine rotation speed $N_E$ can be promptly reduced. If while the switching clutch C0 is not operated the first electric motor M1 is driven in such a direction as to reduce the engine rotation speed $N_E$, the momentum of the drive torque of the first electric motor M1 causes the rotation speed of the differential portion ring gear R0 linked to the automatic ratio shift portion 20 to rise due to the differential motion of the differential portion planetary gear device 24, since the differential portion ring gear R0 linked to the automatic ratio shift portion 20 being presently in the neutral state has a smaller inertia than the differential portion carrier CA0 linked to the engine 8. In other words, a portion of the drive torque of the first electric motor M1 for reducing the engine rotation speed $N_E$ is used to raise the rotation speed of the differential portion ring gear R0 linked to the automatic ratio shift portion 20. However, if the switching clutch C0 is operated, the rotating elements of the differential portion planetary gear device 24 are rotated integrally or rotated substantially integrally, so that the entire drive torque of the first electric motor M1 can be used to reduce the engine rotation speed $N_E$. As a result, the engine rotation speed $N_E$ is promptly reduced by the first electric motor M1, and the high rotation speed of the differential portion ring gear R0 linked to the automatic ratio shift portion 20 can be prevented.

According to the embodiment, the switching clutch C0 is operated if the rotation speed difference between the engine 8 and the differential portion ring gear R0 of the differential portion planetary gear device 24 is within the predetermined range. Therefore, the operation of the switching clutch C0 with the rotation speed difference being large can be avoided. If the switching clutch C0 is operated, with the rotation speed difference being large, the load that acts on the switching clutch C0 becomes large, and therefore there is a possibility of decline of the durability of the switching clutch C0. Therefore, by avoiding the operation of the switching clutch C0 during the state in which the rotation speed difference is large, the decline of the durability of the switching clutch C0 can be restrained.

Furthermore, according to the embodiment, since the switching clutch C0 operates if the rotation speed of the differential portion ring gear R0 is higher than or equal to the predetermined value, the switching clutch C0 is not operated if the rotation speed of the differential portion ring gear R0 is relatively low. If the rotation speed of the differential portion ring gear R0 is relatively low, the operation of the switching clutch C0 is not needed in order to keep the rotation speed of the differential portion ring gear R0 within an allowable rotation speed range even if the rotation speed thereof rises. Therefore, since this control is not executed if the rotation speed of the differential portion ring gear R0 is less than the predetermined value, the burden of the control can be reduced.

According to the embodiment, the restriction of the differential motion is performed by causing the rotation of the differential portion sun gear S0 linked to the first electric motor M1 to be in a fixed or slipping state (by operating the switching brake B0). Therefore, it is possible to restrain the high rotation speed of the differential portion ring gear R0 due to the differential motion of the differential mechanism on the basis of the rotation speed of the differential portion sun gear S0 linked to the first electric motor M1 and the rotation speed of the differential portion carrier CA0 linked to the engine 8.

Furthermore, according to the embodiment, since the restriction of the differential motion is performed by causing at least two rotating elements to be in a locked-up or slipping state (by operating the switching clutch C0), the rotating elements of the differential mechanism are integrally rotated as one unit, so that the high rotation speed of a predetermined rotating element can be restrained.

According to the embodiment, since the automatic ratio shift portion 20 performs automatic ratio shift, the automatic ratio shift is suitably performed in accordance with the state of travel of the vehicle, so that suitable drive force can be obtained.

Furthermore, according to the embodiment, since the automatic ratio shift portion 20 is a stepped-ratio transmission, the speed change ratio is shifted stepwise in a suitable manner in accordance with the state of travel of the vehicle.

Besides, according to the embodiment, since the differential portion 11 is constructed of the first electric motor M1, the second electric motor M2 and the differential portion planetary gear device 24, the rotation speeds of the rotating elements of the differential portion planetary gear device 24 can be suitably controlled by controlling the first and second electric motors M1, M2.

According to the embodiment, since the differential portion 11 is operated as a continuously variable transmission mechanism through the control of the state of operation of the first electric motor M1, a wide range of speed change ratio can be steplessly (or continuously) obtained due to the combination of the speed change ratio of the differential portion 11 and the speed change ratio of the automatic ratio shift portion 20.

While the embodiment of the invention has been described in detail above with reference to the drawings, the invention is applicable in other forms as well.

For example, although in the foregoing embodiment, the switching clutch C0 is disposed between the differential portion sun gear S0 and the differential portion carrier CA0 so as to establish a locked-up or slipping state between the two elements, the position of the switching clutch C0 is not limited so, but may also be, for example, between the differential portion sun gear S0 and the differential portion ring gear R0. That is, the invention can be applied to any construction as long as the switching clutch C0 is disposed so as to establish a locked-up or slipping state between at least two rotating elements of the differential portion sun gear S0, the differential portion carrier CA0, and the differential portion ring gear R0.

Besides, although in the foregoing embodiment, the second electric motor M2 is linked directly to the transmission member 18, the linking position of the second electric motor M2 is not limited so. For example, the second electric motor M2 may be linked to a power transmission path between the differential portion 11 and the driving wheels 34 in a direct fashion or an indirect fashion via a transmission or the like.

According to the embodiment, in the foregoing embodiment, the differential portion 11 functions as an electrical continuously variable transmission whose speed change ratio $\gamma 0$ is continuously shifted in the range of the minimum value $\gamma 0\text{min}$ to the maximum value $\gamma 0\text{max}$. However, the invention can also be applied to other constructions, for example, a construction in which the speed change ratio $\gamma 0$ of the differential portion 11 is shifted not continuously but stepwise through the use of the differential motion.

Besides, in the power distribution mechanism 16 in the foregoing embodiment, the first carrier CA1 is linked to the engine 8, and the first sun gear S1 is linked to the first electric motor M1, and the first ring gear R1 is linked to the transmission member 18. However, the linkage relation is not limited so. That is, the engine 8, the first electric motor M1, and the transmission member 18 may be linked to any of the three elements CA1, S1, R1 of the first planetary gear device 24.

Besides, although in the foregoing embodiment, the engine 8 is directly coupled to the input shaft 14, it suffices that the engine 8 be operatively linked to the input shaft 14, for example, via gears, belts, or the like, and the engine 8 does not need to be disposed on a common axis.

Besides, in the foregoing embodiment, the first electric motor M1 and the second electric motor M2 are disposed coaxially with the input shaft 14, and the first electric motor M1 is linked to the first sun gear S1, and the second electric motor M2 is linked to the transmission member 18. However, it is not altogether necessary to dispose the first and second electric motors in the foregoing manner. For example, the first electric motor M1 and the second electric motor M2 may be linked to the first sun gear S1 and the transmission member 18, respectively, operatively via gears, belts, speed reducers, etc.

Besides, in the foregoing embodiment, the hydraulic type friction engagement devices, such as the first clutch C1, the second clutch C2, etc., may be constructed of magnetic power-type, electromagnetic-type or mechanical-type engagement devices, such as powder (magnetic powder) clutches, electromagnetic clutches, meshing-type dog clutches, etc. For example, in the case where the friction engagement devices are electromagnetic clutches, the hydraulic control circuit 42 is constructed not of a valve device that switches oil passageways, but of a switching device that switches a circuit that outputs an electric command signal to an electromagnetic clutch, or an electromagnetic switch device, etc.

Besides, although in the foregoing embodiment, the automatic ratio shift portion 20 is directly coupled to the differential portion 11 in series via the transmission member 18, the automatic ratio shift portion 20 may also be disposed coaxially on a counter shaft that is provided in parallel with the input shaft 14. In this case, the differential portion 11 and the automatic ratio shift portion 20 are interlinked so as to be capable of power transmission via other types of transmission member 18, for example, a pair of counter gears, a set of transmission members that include a sprocket and a chain, etc. Besides, the foregoing construction of the automatic ratio shift portion 20 is a mere example. The construction of the automatic transmission portion 20 is not particularly limited, but may be freely changed.

Besides, the differential portion planetary gear device 24 as a differential mechanism in the foregoing embodiment may also be, for example, a differential gear device which has pinions that are rotationally driven by the engine, and a pair of bevel gears meshing with the pinions, and the pinions and the bevel gears may be operatively linked to the first electric motor M1 and to the transmission member 18 (to the second electric motor M2).

Besides, although in the foregoing embodiment, the power distribution mechanism 16 is constructed of a set of planetary gears, the power distribution mechanism 16 may also be constructed of two or more planetary gear devices, and may also function as a transmission of three or more ratio steps in a non-differential state (fixed-ratio transmission state). Besides, the planetary gear device is not limited to a single-pinion type, but may also be a double-pinion type planetary gear device. Besides, in the case where the power distribution mechanism 16 is constructed of two or more planetary gear devices, too, the rotating elements of the planetary gear devices are linked to the engine 8, the first and second electric motors M1, M2, and the transmission member 18 so as to be capable of power transmission, and may also be constructed so as to be switchable between the stepped ratio shift and the stepless ratio shift by controlling the clutches C and the brakes B connected to the rotating elements of the planetary gear devices.

Besides, although in the foregoing embodiment, the engine 8 and the differential portion 11 are directly interlinked, their direct interlinkage is not altogether necessary. For example, the engine 8 and the differential portion 11 may be interlinked via a clutch disposed therebetween.

Besides, although in the foregoing embodiment, the differential portion 11 and the automatic ratio shift portion 20 are interconnected in series, this construction is not particularly restrictive. The invention is applicable to any construction as long as it includes a function that performs electric differential motion in the transmission mechanism 10 as a whole, and a function that performs ratio shift by a principle that is different from that of the ratio shift performed by the electric differential motion in the transmission mechanism 10 as a whole. The differential portion 11 and the automatic transmission portion 20 do not need to be mechanically independent. Besides, the arrangement position and arrangement order of these components are not particularly limited, but may be freely determined. Besides, as for the transmission mechanism, as long as the mechanism has a function that performs electric differential motion and a function that performs ratio shift, the invention can be applied to such a construction even if the configurations of the functions have a portion in common, or share a portion, or have the entire portions in common.

Incidentally, the foregoing embodiment is merely one embodiment, and the invention can be carried out in various forms with modifications and improvements.

What is claimed is:

1. A control device for a vehicle power transmission device, the vehicle power transmission device including an electrical differential portion that includes a differential mechanism and a first electric motor and in which a differential state between rotation speed of an input shaft and rotation speed of an output shaft is controlled through control of operation of the first electric motor that is linked to a rotating element of the differential mechanism so as to be capable of power transmission, and an engagement device that constitutes a portion of a power transmission path between the electrical differential portion and a driving wheel, the control device comprising:

a lock mechanism that restricts the differential state of the differential mechanism and that operates if rotation speed of the rotating element of the differential mechanism is greater than or equal to a predetermined value; and an engine stop control device that operates the lock mechanism when an engine stop control is executed while the engagement device is in a non-engaged state and that controls applying a drive torque in such a direction as to reduce engine rotation speed, to the first electric motor linked to the rotating element of the differential mechanism so as to be capable of power transmission.

2. The control device according to claim 1, further comprising a ratio shift portion provided on the power transmission path, wherein the engagement device is a portion of the ratio shift portion.

3. The control device according to claim 2, wherein the ratio shift portion performs an automatic ratio shift.

4. The control device according to claim 2, wherein the ratio shift portion is a stepped-ratio transmission.

5. The control device according to claim 1, wherein the lock mechanism operates if a rotation speed difference between the engine and the rotating element of the differential mechanism is within a predetermined range.

6. The control device according to claim 1, wherein the differential state is restricted by causing rotation of the rotating element linked to the first electric motor to be in a fixed or slipping state.

7. The control device according to claim 1, wherein the differential state is restricted by causing at least two rotating elements to be in a locked-up or slipping state.

8. The control device according to claim 1, wherein the electrical differential portion is constructed of at least two electric motors, and a planetary gear device.

9. The control device according to claim 1, wherein the electrical differential portion operates as a continuously variable transmission mechanism due to control of operation of the first electric motor.

10. The control device according to claim 1, wherein the lock mechanism causes the differential mechanism to be in a non-differential state.

11. A control method for a vehicle power transmission device, the vehicle power transmission device including an electrical differential portion that includes a differential mechanism and a first electric motor and in which a differential state between rotation speed of an input shaft and rotation speed of an output shaft is controlled through control of operation of the first electric motor that is linked to a rotating element of the differential mechanism so as to be capable of power transmission, and an engagement device that constitutes a portion of a power transmission path between the electrical differential portion and a driving wheel, the control method comprising:
restricting the differential state of the differential mechanism when rotation speed of the rotating element of the differential mechanism is greater than or equal to a predetermined value;
operating a lock mechanism when an engine stop control is executed while the engagement device is in a non-engaged state; and
applying a drive torque in such a direction as to reduce engine rotation speed, to the first electric motor linked to the rotating element of the differential mechanism so as to be capable of power transmission.

12. The control method according to claim 11, wherein if a rotation speed difference between the engine and the rotating element of the differential mechanism is within a predetermined range, the differential state of the differential mechanism is restricted.

13. The control method according to claim 11, wherein the differential state is restricted by causing rotation of the rotating element linked to the first electric motor to be in a fixed or slipping state.

14. The control method according to claim 11, wherein the differential state is restricted by causing at least two rotating elements to be in a locked-up or slipping state.

15. The control method according to claim 11, wherein the lock mechanism causes the differential mechanism to be in a non-differential state.

16. The control device according to claim 1, wherein the engine stop control device automatically operates the lock mechanism when the engine stop control is executed while the engagement device is in the non-engaged state.

17. The control method according to claim 11, further comprising automatically operating the lock mechanism when the engine stop control is executed while the engagement device is in the non-engaged state.

* * * * *